US012793089B2

(12) United States Patent
Sheppard et al.

(10) Patent No.: US 12,793,089 B2
(45) Date of Patent: Nov. 10, 2026

(54) METHODS, SYSTEMS AND APPARATUS FOR AUDIENCE- BASED DEDUPLICATION USING VECTOR-OF-COUNTS (VOC) CENTRAL MOMENTS

(71) Applicant: The Nielsen Company (US), LLC, New York, NY (US)

(72) Inventors: Michael Sheppard, Holland, MI (US); Jonathan Sullivan, Hurricane, UT (US); Jake Dailey, San Francisco, CA (US); Jessica Brinson, Chicago, IL (US); Christie Nicole Summers, Baltimore, MD (US); Diane Morovati Lopez, West Hills, CA (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 521 days.

(21) Appl. No.: 17/898,265

(22) Filed: Aug. 29, 2022

(65) Prior Publication Data

US 2023/0177531 A1 Jun. 8, 2023

Related U.S. Application Data

(60) Provisional application No. 63/286,511, filed on Dec. 6, 2021.

(51) Int. Cl.
*G06Q 30/0201* (2023.01)
*G06F 16/215* (2019.01)

(52) U.S. Cl.
CPC ....... *G06Q 30/0201* (2013.01); *G06F 16/215* (2019.01)

(58) Field of Classification Search
CPC .............. G06F 16/215; G06Q 30/0201; G06Q 30/0242
See application file for complete search history.

(56) References Cited

U.S. PATENT DOCUMENTS 6,108,637 A 8/2000 Blumenau
6,349,296 B1 2/2002 Broder
(Continued)

FOREIGN PATENT DOCUMENTS

KR 20110023293 A 3/2011
WO 2015023589 A1 2/2015
WO 2016086905 A1 6/2016

OTHER PUBLICATIONS

Bhatt et al., "Can Combining Demographics and Biometrics Improve De-duplication Performance," IEEE Conference on Computer Vision and Pattern Recognition Workshops (CVPRW), 2013, 6 pages.
(Continued)

*Primary Examiner* — Charles D Adams

(57) ABSTRACT

Methods, apparatus, and systems are disclosed for audience-based deduplication using vector-of-counts (VOC) central moments. An example system to determine an audience size for media based on vector of counts sketch data, the system including memory, programmable circuitry, and instructions to cause the programmable circuitry to apply a hash function to first vector of counts sketch data, second vector of counts sketch data, and third vector of counts sketch data to remove personally identifiable information, determine a first covariance matrix associated with intersection cardinalities of at least two of the first, second, or third vector of counts, determine a second covariance matrix associated with disjoint cardinalities of the at least two of the first, second, or third vector of counts, and determine the audience size based on the first covariance matrix or the second covariance matrix.

13 Claims, 10 Drawing Sheets

(56) References Cited

U.S. PATENT DOCUMENTS

| | | | | |
|---|---|---|---|---|
| 6,453,173 | B1 | 9/2002 | Reber | |
| 8,165,414 | B1 | 4/2012 | Yagnik | |
| 8,234,151 | B1 | 7/2012 | Pickton | |
| 8,370,489 | B2 | 2/2013 | Mazumdar et al. | |
| 8,453,173 | B1 | 5/2013 | Anderson et al. | |
| 8,930,701 | B2 | 1/2015 | Burbank | |
| 8,984,547 | B2 | 3/2015 | Lambert | |
| 9,117,227 | B1 | 8/2015 | Agrawal et al. | |
| 9,237,138 | B2 | 1/2016 | Bosworth et al. | |
| 9,575,681 | B1 | 2/2017 | Fisher | |
| 9,785,666 | B2 | 10/2017 | Li | |
| 10,248,811 | B2 | 4/2019 | Sullivan | |
| 11,416,461 | B1 | 8/2022 | Sheppard et al. | |
| 11,561,942 | B1 | 1/2023 | Sheppard et al. | |
| 11,853,454 | B1 * | 12/2023 | Tarsi | G06F 21/602 |
| 2001/0049620 | A1 * | 12/2001 | Blasko | G06Q 30/0207 705/14.1 |
| 2002/0056087 | A1 | 5/2002 | Berezowski | |
| 2003/0014399 | A1 | 1/2003 | Hansen et al. | |
| 2006/0074859 | A1 * | 4/2006 | Gange | G16C 20/40 707/E17.135 |
| 2007/0136225 | A1 | 6/2007 | Church | |
| 2008/0016016 | A1 | 1/2008 | Mitarai | |
| 2008/0276179 | A1 | 11/2008 | Borenstein et al. | |
| 2010/0205430 | A1 | 8/2010 | Chiou | |
| 2010/0242061 | A1 | 9/2010 | Levitan | |
| 2011/0106620 | A1 | 5/2011 | Setiawan | |
| 2011/0202500 | A1 | 8/2011 | Warn et al. | |
| 2012/0072469 | A1 | 3/2012 | Perez | |
| 2013/0262181 | A1 | 10/2013 | Topchy | |
| 2014/0075018 | A1 | 3/2014 | Maycotte | |
| 2015/0193813 | A1 | 7/2015 | Toupet et al. | |
| 2015/0248615 | A1 | 9/2015 | Parra | |
| 2015/0261750 | A1 * | 9/2015 | Blaas | G06F 16/2237 707/747 |
| 2016/0034201 | A1 | 2/2016 | Chambliss | |
| 2016/0086208 | A1 | 3/2016 | Oliver | |
| 2016/0134934 | A1 | 5/2016 | Jared | |
| 2016/0189181 | A1 | 6/2016 | Mcclave | |
| 2016/0224866 | A1 | 8/2016 | Shinichi | |
| 2016/0323616 | A1 | 11/2016 | Doe | |
| 2016/0379235 | A1 | 12/2016 | Mendrisova | |
| 2016/0379246 | A1 | 12/2016 | Sheppard | |
| 2016/0381109 | A1 | 12/2016 | Barnett | |
| 2017/0004526 | A1 | 1/2017 | Morovati | |
| 2017/0011420 | A1 | 1/2017 | Sullivan | |
| 2017/0053306 | A1 | 2/2017 | Sissenich | |
| 2017/0083580 | A1 | 3/2017 | Sheppard | |
| 2017/0091794 | A1 * | 3/2017 | Sheppard | G06Q 30/0204 |
| 2017/0155956 | A1 | 6/2017 | Nagaraja Rao | |
| 2017/0257596 | A1 | 9/2017 | Murata | |
| 2018/0176622 | A1 | 6/2018 | Sheppard | |
| 2018/0332177 | A1 | 11/2018 | Shah | |
| 2019/0114343 | A1 | 4/2019 | Guo | |
| 2019/0147461 | A1 | 5/2019 | Sheppard | |
| 2019/0220873 | A1 | 7/2019 | Sullivan | |
| 2021/0004864 | A1 | 1/2021 | Daub | |
| 2021/0406232 | A1 | 12/2021 | Sheppard | |
| 2022/0391366 | A1 | 12/2022 | Sheppard et al. | |

OTHER PUBLICATIONS

Coffey et al., "Internet Audience Measurement: A Practitioner's View," Journal of Interactive Advertising, vol. 1, No. 2, pp. 10-17, 2001, 8 pages.

Metzger et al., "Public Opinion and Policy Initiatives for Online Privacy Protection," Journal of Broadcasting & Electronic Media, Sep. 2003, 25 pages.

International Searching Authority, "International Search Report," issued in connection with PCT No. PCT/US2014/050551, on Nov. 24, 2014, 1 page.

Ma et al., "Compute N-Way De-Duplicated Reach Using Privacy Safe Vector of Counts," Technical Disclosure Commons, Apr. 15, 2020, 14 pages.

Peng et al., "Privacy-centric Cross-publisher Reach and Frequency Estimation Via Vector of Counts," Dec. 2020, 38 pages.

United States Patent and Trademark Office, "Non Final Office Action", issued in connection with U.S. Appl. No. 16/919,973, dated Sep. 17, 2021, 16 pages.

United States Patent and Trademark Office, "Non-Final Rejection," issued in connection with U.S. Appl. No. 16/919,974, dated Feb. 16, 2022, 21 pages.

United States Patent and Trademark Office, "Notice of Allowance and Fee(s) Due." issued Mar. 16, 2022 in connection with U.S. Appl. No. 16/919,973, 10 pages.

United States Patent and Trademark Office, "Notice of Allowance", issued in connection with U.S. Appl. No. 16/919,973, dated Mar. 25, 2022, 6 pages.

United States Patent and Trademark Office, "Non-Final Office Action," issued in connection with U.S. Appl. No. 16/917,459, dated Apr. 26, 2022, 21 Pages.

United States Patent and Trademark Office, "Notice of Allowance," issued in connection with U.S. Appl. No. 16/919,973, issued Jun. 8, 2022, 7 pages.

United States Patent and Trademark Office, "Final Rejection," issued in connection with U.S. Appl. No. 16/919,974, dated Jun. 9, 2022, 23 pages.

United States Patent and Trademark Office, "Notice of Allowance," issued in connection with U.S. Appl. No. 16/919,973, dated Jul. 11, 2022, 6 pages.

United States Patent and Trademark Office, "Advisory Action," issued in connection with U.S. Appl. No. 16/919,974, dated Sep. 12, 2022, 3 pages.

United States Patent and Trademark Office, "Final Office Action," issued Sep. 30, 2022 in connection with U.S. Appl. No. 16/917,459, 13 pages.

United States Patent and Trademark Office, "Notice of Allowance and Fee(s) Due," issued in connection with U.S. Appl. No. 16/919,974, dated Dec. 2, 2022, 11 pages.

United States Patent and Trademark Office, "Non-Final Office Action", issued in connection with U.S. Appl. No. 16/917,459, on Mar. 2, 2023, 7 pages.

* cited by examiner

METHODS, SYSTEMS AND APPARATUS FOR AUDIENCE- BASED DEDUPLICATION USING VECTOR-OF-COUNTS (VOC) CENTRAL MOMENTS

RELATED APPLICATIONS

This patent arises from a non-provisional patent application that claims the benefit of U.S. Provisional Patent Application No. 63/286,511, which was filed on Dec. 6, 2021. U.S. Provisional Patent Application No. 63/286,511 is hereby incorporated herein by reference in its entirety. Priority to U.S. Provisional Patent Application No. 63/286,511 is hereby claimed.

FIELD OF THE DISCLOSURE

This disclosure relates generally to monitoring audiences and, more particularly, to methods, systems, and apparatus for audience-based deduplication using vector-of-counts (VOC) central moments.

BACKGROUND

Media is accessible to users through a variety of platforms. For example, media can be viewed on television sets, via the Internet, on mobile devices, in-home or out-of-home, live or time-shifted, etc. Understanding consumer-based engagement with media within and across a variety of platforms (e.g., television, online, mobile, and emerging) allows media providers and website developers to increase user engagement with their media.

Figure 1:
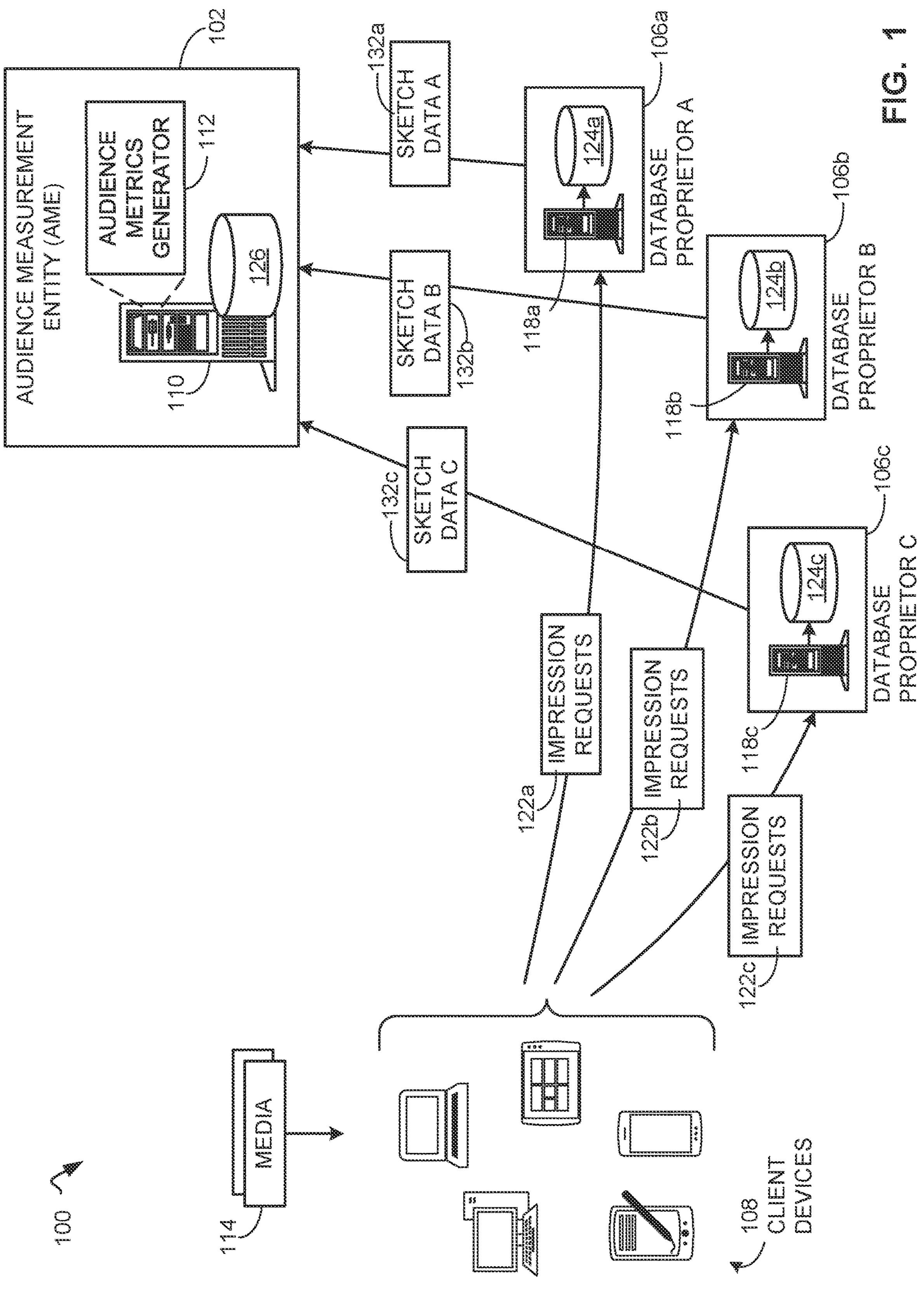
FIG. 1 is an example environment to implement a technique for logging impressions of accesses to server-based media.

In general, the same reference numbers will be used throughout the drawing(s) and accompanying written description to refer to the same or like parts. The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client device requests the media, both the media and the monitoring instructions are downloaded to the client device. The monitoring instructions are, thus, executed whenever the media is accessed, be it from a server or from a cache. Upon execution, the monitoring instructions cause the client device to send or transmit monitoring information from the client device to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from client devices (who may not be a member of an audience measurement panel and, thus, may be unknown to the AME) by redirecting the client devices from the AME to a database proprietor, such as a social network site partnered with the AME, using an impression response. Such a redirection initiates a communication session between the client device accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client device to thereby identify the client device based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors, custom date ranges, custom combinations of assets and platforms, etc. Some deduplication techniques perform deduplication across database proprietors using particular systems (e.g., Nielsen's TV Panel Audience Link). For example, such deduplication techniques match or probabilistically link personally identifiable information (PII) from each source. Such deduplication techniques require storing massive amounts of user data or calculating audience overlap for all possible combinations, neither of which are desirable. PII data can be used to represent and/or access audience demographics (e.g., geographic locations, ages, genders, etc.).

In some situations, while the database proprietors may be interested in collaborating with an AME, the database proprietor may not want to share the PII data associated with its subscribers to maintain the privacy of the subscribers. One solution to the concerns for privacy is to share sketch data that provides summary information about an underlying dataset without revealing PII data for individuals that may be included in the dataset. As such, the PII data can be hidden, obscured, and/or protected. Such sketch data may include a cardinality defining the number of unique individuals represented by the data (e.g., subscribers) while maintaining the identity of such individuals private. For example, if the sketch data includes multiple counts for a particular audience member, that audience member is represented in a cardinality as only one audience member. As such, if only 60 audience members are responsible for a duplicated audience count (e.g., an impression count) of 100 in sketch data, the cardinality of that sketch data is 60. In such examples, a first audience member may be responsible for only one impression in the sketch data, while a second audience member may be responsible for two or more impressions in the sketch data. As such, a duplicate audience count means an audience count in which an audience member can be responsible for any number of multiple impressions. The cardinality of sketch data associated with media exposure is a useful piece of information for an AME because it provides an indication of the number of unique audience members exposed to particular media via a platform maintained by the database proprietor providing the sketch data. However, problems for audience metrics arise when the media may be accessed via multiple different database proprietors that each provide separate sketch data summarizing the individual subscribers that were exposed to the media. In particular, the sum of the cardinalities of each sketch data is not a reliable estimate of the unique audience size because the same individual may be represented in multiple datasets associated with different sketch data. As a result, such individuals will be double counted resulting in the incorrection inflation of the unique audience size. Examples disclosed herein overcome the above challenges by enabling the estimation of sketch data provided by three different datasets so that an AME may be able to deduplicate individuals represented across the three datasets, thereby enabling the accurate estimate of the unique audience for a particular media item.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets (e.g., sketch data) is generated.

Although examples disclosed herein are described in association with audience metrics related to media impressions, examples disclosed herein may be similarly used for other applications to deduplicate between any three datasets while preserving privacy. The datasets themselves need not be audiences or email addresses. They could be, for example, bank accounts, lists of purchased items, store visits, traffic patterns, etc. The datasets could be represented as lists of numbers or any other information.

FIG. 1 shows an example environment 100 that includes an example audience measurement entity (AME) 102, an example database proprietor A 106*a*, an example database proprietor B 106*b*, an example database proprietor C 106*c* and example client devices 108. The example AME 102 includes an example AME computer 110 that implements an example audience metrics generator circuitry 112 to determine audience sizes based on media impressions logged by the database proprietors 106*a-c*. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, smart televisions, and/or any other type of device that may be connected to the Internet and capable of accessing and/or presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietors 106*a-c*. For example, the database proprietors 106*a-c* include corresponding database proprietor servers 118*a-c* that can serve media 114 to their corresponding subscribers via the client devices 108. Examples disclosed herein can be used to generate audience metrics data that measures audience sizes of media served by different ones of the database proprietors 106*a-c*. For example, the database proprietors 106*a-c* may use such audience metrics data to promote their online media serving services (e.g., ad server services, media server services, etc.) to prospective clients. By showing audience metrics data indicative of audience sizes drawn by corresponding ones of the database proprietors 106*a-c*, the database proprietors 106*a-c* can sell their media serving services to customers interested in delivering online media to users.

In some examples, the media 114 is presented via the client devices 108. When the media 114 is accessed by the client devices 108, the client devices 108 send impression requests 122*a-c* to the database proprietor servers 118*a-c* to inform the database proprietor servers 118*a-c* of the media accesses. In this manner, the database proprietor servers 118*a-c* can log media impressions in impression records of corresponding database proprietor audience metrics databases 124*a-c*. When a database proprietor 118*a-c* serves the media 114, the impression request 122*a-c* includes a first-party cookie set by that database proprietor 118*a-c* so that the database proprietor 118*a-c* can log an impression for the media 114 without using a third-party cookie. In some examples, the client devices 108 also send impression requests 122*a-c* to the AME 102 so that the AME 102 can log census impressions in an AME audience metrics database 126. In the illustrated example of FIG. 1, the database proprietors 106*a-c* log demographic impressions corresponding to accesses by the client devices 108 to the media 114. Demographic impressions are impressions logged in association with demographic information collected by the database proprietors 106*a-c* from registered subscribers of their services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the census impressions include some media impressions accessed via a platform maintained by the database proprietor A 106*a*, some media impressions accessed via a platform maintained by the database proprietor B 106*b*, and some media impressions accessed via a platform maintained by the database proprietor C 106*c*. In some examples, the AME computer 110 does not collect impressions, and examples disclosed herein are based on audience data from impressions collected by the database proprietors 106*a-c*.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and/or episode number. When the example media 114 includes advertisements, such advertisements may be content and/or advertisements. The advertisements may be individual, standalone ads and/or may be part of one or more ad campaigns. In some examples, the ads of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122*a-c* (e.g., also referred to as tag requests) to one or more specified servers of the AME 102, the database proprietor A 106*a*, the database proprietor B 106*b* and/or the database proprietor C 106*c*. As used herein, tag requests 122*a-c* are used by the client devices 108 to report occurrences of media impressions caused by the client devices accessing the media 114. In the illustrated example, the tag requests 122*a-c* include user-identifying information that the database proprietors 106*a-c* can use to identify the subscriber that accessed the media 114. For example, when a subscriber of the database proprietor A 106*a* logs into a server of the database proprietor A 106*a* via a client device 108, the database proprietor A 106*a* sets a database proprietor cookie on the client device 108 and maps that cookie to the subscriber's identity/account information at the database proprietor server 118*a*. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other person information provided by subscribers in exchange for services from the database proprietors 106*a-c*. By having such PII data mapped to database proprietor cookies, the database proprietor A 106*a* can subsequently identify the subscriber based on the database proprietor cookie to determine when that user accessed different media 114 and to log an impression in association with demographics and/or other PII data of that user. In the illustrated example of FIG. 1, the impression requests 122*a-c* include database proprietor cookies of the client devices 108 to inform the database proprietors 106*a-c* of the particular subscribers that accessed the media 114. In some examples, the AME 102 also sets AME cookies in the client devices 108 to identify users that are enrolled in a panel of the AME 102 such that the AME 102 collects PII data of people that agree to having their internet activities monitored by the AME 102.

The tag requests 122*a-c* may be implemented using HTTP requests. However, whereas HTTP requests are network communications that traditionally identify web pages or other resources to be downloaded, the tag requests 122*a-c* of the illustrated example are network communications that include audience measurement information (e.g., ad campaign identification, content identifier, and/or user identification information) as their payloads. The server (e.g., the AME computer 110 and/or the database proprietor servers 118*a-c*) to which the tag requests 122*a-c* are directed is programmed to log occurrences of impressions reported by the tag requests 122*a-c*. Further examples of monitoring instructions (e.g., beacon instructions) and uses thereof to collect impression data are disclosed in Mazumdar et al., U.S. Pat. No. 8,370,489, entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and cause the client device 108 to send one or more of the impression requests 122*a-c* to report the access to the media 114. In such examples, the data collector can obtain user identifiers and/or device identifiers stored in the client devices 108 and send them in the impression requests 122*a-c* to enable the database proprietors 106*a-c* and/or the AME 102 to log impressions. Further examples of using a collector in client devices to collect impression data are disclosed in Burbank et al., U.S. Pat. No. 8,930,701, entitled "Methods and Apparatus to Collect Distributed User Information for Media Impressions and Search Terms," and in Bosworth et al., U.S. Pat. No. 9,237,138, entitled "Methods and Apparatus to Collect Distributed User Information for Media Impressions and Search Terms," both of which are hereby incorporated herein by reference in their entireties.

In some examples, the database proprietor servers 118*a-c* may additionally or alternatively user server logs to log impressions based on requests for media 114 from the client devices 108. For example, when a user of a client device 108 provides a URL or selects an item of media for viewing, the client device 108 sends an HTTP request (e.g., the impression request 122*a-c*) to a database proprietor server 118*a-c* that includes the first-party cookie and an identifier of the requested media. In response, the database proprietor server 118*a-c* serves the requested media to the client device 108 and logs an impression of the media as attributable to the client device 108.

In the illustrated example, the database proprietors 106*a-c* would like to collaborate with the AME 102 so that the AME 102 can operate as an independent party that measures and/or verifies audience measurement information pertaining to the media 114 accessed by the subscribers of the database proprietors 106*a-c*. However, the database proprietors 106*a-c* desire to do so while protecting the privacies of their subscribers by not sharing or revealing subscriber identities, subscriber information, and/or any other subscriber PII data to outside parties. In examples disclosed herein, to share impression data with the AME 102 without revealing subscriber identities, subscriber information, and/or any other subscriber PII data, the database proprietors 106*a-c* process their collected impression data to generate corresponding sketch data 132*a-c*.

As used herein, sketch data is an arrangement of data for use in massive data analyses. For example, operations and/or queries that are specified with respect to the explicit and/or very large subsets, can be processed instead in sketch space (e.g., quickly (but approximately) from the much smaller sketches representing the actual data). This enables processing each observed item of data (e.g., each logged media impression and/or audience member) quickly in order to create a summary of the current state of the actual data. In some examples, the sketch data 132*a-c* corresponds to a vector of values generated by processing data entries in the database through one or more hash functions. More particularly, in some examples, the PII associated with particular audience members are used as inputs for the hash function(s) to generate outputs corresponding to the values of the vector for the sketch data. Inasmuch as hashing functions cannot be reversed, the PII data for the particular audience members is kept private, thereby preserving the anonymity of the underlying raw data represented by the sketch data 132*a-c*. While it would be possible to generate a vector for sketch data of all subscribers of either one of the database proprietors 106*a-c*, in many instances, the subscribers included in particular sketch data may be the subset of all subscribers that corresponds to audience members that accessed and/or were exposed to a particular media item 114 of interest.

In some examples, the database proprietors 106*a-c* agree on a method of hashing and summarizing their respective data. For example, the agreed upon type of hashing and summary type may involve the use of binomial hash on different entries in a database to generate sketch data based on a vector of counts. As used herein, a binomial hash (also referred to herein as a bit hash) is a hash function that generates a vector or array of multiple binary outputs (e.g., a string of 0s and/or 1s) from any input (e.g., an audience member's email address) with each element in the array being equally likely (e.g., there is a 50% chance that any given bit in the array will be a 0 and a 50% chance that the bit will be a 1). In some examples, the hash may generate an output that is not in binary form but may be converted to binary form with just 0s and Is. For example, the hash may generate the hexadecimal output of D447, which would convert to the binary array of 1101010001000111. Further, the hash is defined such that any combination of array values generated by the hash function (e.g., any combination of 0s and 1s or other digits and/or letters for non-binary outputs) is equally likely as any other combination of array values. Further still, the hash is defined such that the same output will always result from the same input. As such, if database proprietors 106*a-c* use the same hash function on the same PII (e.g., "johnsmith@email.com"), database proprietors 106*a-c* will output the same array of values.

In some examples, to generate the final vector of counts sketch data, the output of the hash function applied to each entry in the database is used to generate an integer value from 1 to k, where k is the number of elements in the vector of counts. The transformation of the output of the hash function to the integer value may be accomplished in any manner that results in a distribution that is uniform (e.g., there is a 1/k probability for any given integer value resulting from the transformation) and consistent (e.g., the same output of the hash function always produces the same integer value). The integer value derived from the output of the hash function applied to a particular data entry is used to identify the particular element within the vector of counts that is to be incremented by 1 to represent the particular data entry. For example, if a first entry in a database (e.g., "johnsmith@email.com") is hashed to the binary array of 11010100, and the total number of elements in the vector of counts is k=16, then only four bits are needed to define any integer value from 1 to 16. Accordingly, in some examples, the four leading bits of 1101 are selected to define a base ten number corresponding to the integer value. That is, the binary value of 1101 corresponds to the decimal number 13 such that the $13^{th}$ element (out of 16) in the vector of counts is incremented by 1. As subsequent entries in the database are hashed and transformed to an integer value, the corresponding element in the vector of counts is incremented such that each element in the final vector will represent a count of the total number of entries designated to each element in the vector. As a result, the summation of values across all elements in the vector of counts will correspond to the cardinality of the sketch data (e.g., the total number of unique entries in the database represented by the vector of counts). In some examples, multiple different hash functions may be applied to each entry and assigned to a particular element within the vector of counts based on the process outlined above. In such examples, the summation of values across all elements in the vector of counts will correspond to the cardinality of the sketch data multiplied by the number of hash functions used. For purposes of explanation, examples described below assume only one hash function is used. However, examples disclosed herein may be used with any number of hash functions.

As a more specific example, assume that the sketch data A 132*a* represents 1000 different subscribers and that the sketch data B 132*b* represents 2000 different subscribers where both sketch data 132*a-b* is a vector of counts of length 10. If the hash function used for all 1000 subscribers in the sketch data A 132*a* generates outputs for 90 of the subscribers that transform to an integer value of 1, the first element in the vector of counts sketch data A 132*a* would be 90. The remaining nine elements in the vector of counts would be assigned values corresponding to the total number of outputs of the hash functions used across the remaining 910 subscribers that was transformed to each of the integer values 2 through 16. The values in the vector of counts for the sketch data B 132*b* generated by the database proprietor B 106*b* is likely to be different than for the sketch data A 132*a* because the database proprietor B 106*b* has different subscribers than the database proprietor A 106*a* potentially resulting in different outputs for the hash functions that are designated to different elements in the vector of counts. Furthermore, the values in the vectors for the sketch data 132*a-c* are likely to differ because a different total number of subscribers are included in the sketch data (e.g., 1000 subscribers for the sketch data A 132*a* and 2000 subscribers for the sketch data B 132*b*).

Once the database proprietors 106*a-c* have generated the vector of counts for the sketch data 132*a-c*, the database proprietors 106*a-c* may provide the sketch data 132*a-c* to the AME computer 110 for use in estimating audience sizes of media items 114 accessed via the Internet on the client devices 108 by user subscribers of the database proprietors 106*a-c* that are reported in the sketch data 132*a-c*. In some examples, the database proprietors 106*a-c* may modify the vector for the sketch data 132*a-c* before delivering the same to the AME 102. For instance, in some examples, the database proprietors 106*a-c* may elect to insert noise into the vector for the sketch data 132*a-c* to produce data with a secondary level of privacy protection for the PII data of the subscribers. However, in some examples, the database proprietors 106*a-c* may elect not to insert noise.

In some examples, in addition to the vector of counts, the sketch data 132*a-c* may also include an indication of the cardinality associated with the vector. That is, in some examples, the database proprietors 106*a-c* report the total number of subscribers represented by the sketch data 132*a-c* (e.g., 1000 subscribers for sketch data A 132*a* and 2000 subscribers for sketch data B 132*b* in the above example). The cardinality may not be necessary when no noise is included in the sketch data 132*a-c* because, as indicated above, the cardinality corresponds to the sum of values across all elements in the vector of counts. However, when noise is included, the sum of values may not correspond to the actual cardinality of the underlying data such that the cardinality may be separately provided. The total number of subscribers represented across sketch data 132*a-c* (e.g., the cardinalities of the sketch data) is not an indication of the audience size of an associated media item 114 because one or more of the subscribers represented in the sketch data A 132*a* may also be represented in the sketch data B 132*b* and/or sketch data C 132*c*. Examples disclosed herein enable the deduplication of audience members across three datasets to estimate the true unique audience for the particular media of interest.

For example, |S| can represent a cardinality of dataset S, where cardinality can be defined as the number of unique elements. If S={a, b, b, b, a, a, b}, then |S|=2, representing two unique elements (e.g., {a, b}). For three datasets, any particular audience member can belong to a total of seven mutually exclusive sets that exist as mutually exclusive and exhaustive (e.g., representing seven partitions of a Venn diagram using three intersecting circles). Disjoint cardinalities can be denoted as n . . . to represent cardinality of a set specified by Boolean indices {***}. For example, non can represent the number of elements not in a first database but present in both a second and a third database. As such, the cardinalities can be broken down into a collection of seven numbers, one for each mutually exclusive set, as represented using $\{n_{001}, n_{010}, n_{011}, n_{100}, n_{101}, n_{110}, n_{111}\}$. Any Boolean expression of memberships across the three datasets can be computed using the seven disjoint cardinalities. For example, the answer can be an additional of a possible subset of the collection of seven numbers. In some examples, a different set of cardinalities can be used instead of disjoint sets. For example, $|A_i|$ can be defined to be a cardinality of an ith dataset, $|A_{ij}|$ can be defined to be the cardinality of numbers in the $i^{th}$ and $j^{th}$ datasets, and $|A_{ijk}|$ can be defined to be a cardinality of numbers that are in all three sets. Such intersection cardinalities express how many elements are any single, double, or triple intersections. As such, the identities shown in connection with example Equation Set 1 can be obtained based on the intersection cardinalities:

$$A_1 = n_{100} + n_{101} + n_{110} + n_{111} \quad \text{Equation Set 1}$$
$$A_2 = n_{010} + n_{011} + n_{110} + n_{111}$$
$$A_3 = n_{001} + n_{011} + n_{101} + n_{111}$$
$$A_{12} = n_{110} + n_{111}$$
$$A_{13} = n_{101} + n_{111}$$
$$A_{23} = n_{011} + n_{111}$$
$$A_{123} = n_{111}$$

In some examples, a linear transformation from the intersection cardinality set {A} to the disjoint cardinality set {n} can be obtained using example Equation Set 2:

$$n_{001} = A_3 - A_{13} - A_{23} + A_{123} \quad \text{Equation Set 2}$$
$$n_{010} = A_2 - A_{12} - A_{23} + A_{123}$$
$$n_{011} = A_{23} - A_{123}$$

-continued $$n_{100} = A_1 - A_{12} - A_{13} + A_{123}$$
$$n_{101} = A_{13} - A_{123}$$
$$n_{110} = A_{12} - A_{123}$$
$$n_{111} = A_{123}$$

In some examples, total cardinality across all three sets can be determined in two identical ways, using either the principle of inclusion-exclusion on the intersection cardinalities, or simple summations of all the disjoint cardinalities (e.g., $A=A_1+A_2+A_3-A_{12}-A_{13}-A_{23}+A_{123}=n_{001}+n_{010}+n_{011}+n_{100}+n_{101}+n_{110}+n_{111}$). In some examples, single intersection cardinalities (e.g., $\{A_1, A_2, A_3\}$) can be used to represent the cardinality of a database proprietor's respective datasets, with a vector of counts methodology used to estimate the intersection cardinalities. In some examples, an advantage of disjoint cardinalities is based on the theoretical construction of the vector of counts methodology along with statistical properties of estimates. In examples disclosed herein, the vector of counts methodology can be extended to three datasets.

Vector of counts methodology can include a vector of counts construction phase and an estimator phase (e.g., a function of the vectors used to produce an estimate of different cardinalities). As shown in examples disclosed herein, a covariance-estimator can be used for two datasets, where covariance refers to two distributions, whereas central-moment can be applicable to any number of distributions. Constructing a vector of counts for any dataset is based on uniform random allocation, where the probability distribution which models that allocation is a uniform multinomial distribution. For example, a vector length (k) can be determined and agreed upon by all database proprietors (e.g., database proprietor A, database proprietor B, database proprietor C, etc.), such that the entries in the vector are labelled according to an index {1, . . . , k} and each entry has a 1/k probability of being selected. As previously described, all database proprietors can agree on the same hash function and methodology associated with assigning an element to an entry within the vector of length k. In some examples, the PII corresponding to an email address (e.g., "johnsmith@email.com") can be hashed to $8FFC87_{16}$ and transformed to entry 77 out of vector length 200. An element found in multiple datasets (e.g., such as an email address) allows database proprietors to agree on the hashed value of that element, as well as which entry within the vector can be updated within the counts, where the output for any database proprietor is a vector of counts. Without loss of generality, each database proprietor can mean-center their vector of counts. For example, given k=10 and $A_1$=100, an allocation of an entry in a given database can be represented as X={106, 96, 111, 91, 98, 96, 107, 101, 105} or mean-centered to X'={6, −4, 11, −9, −2, −11, −4, 7, 1, 5}. For two datasets, an output of the allocation after mean-centering can be as follows: X'={8, 13, 9, −4, −3, −10, −22, 9, 6, −6} and Y'={−12, 6, 11, −4, −13, 17, 6, −4, −3, −4}. An estimator function can use the mean-centered inputs to estimate the intersection cardinality. For three datasets, a vector of counts without mean-centering can be represented as follows: X={100, 101, 92, 95, 100, 98, 91, 103, 97, 123}, Y={187, 201, 217, 193, 214, 191, 198, 193, 191, 215}, and Z={299, 289, 300, 305, 318, 284, 317, 294, 282, 312}. In some examples, generalization of the covariance-estimator of two datasets can be performed to a central-moments estimator for three datasets, as shown in connection with examples disclosed herein.

When considering two datasets, the unique audience (A) for media represented across sketch data (e.g., sketch data

132*a-b* from two database proprietors 106*a-b*) may be defined mathematically by Equation 3 as follows:

$$A=A_1+A_2-A_{12} \quad \text{Equation 3}$$

where $A_1$ is the known (e.g., provided) cardinality for sketch data A 132*a*, $A_2$ is the known (e.g., provided) cardinality for sketch data B 132*b*, and $A_{12}$ is the number of unique entries represented in both sketch data A 132*a* and sketch data B 132*b*. The number of unique entries ($A_{12}$) that overlap in both sketch data A 132*a* and sketch data B 132*b* (e.g., the number of duplicate audience members across the combination of sketch data from both database proprietors 106*a-b*) is the only unknown in Equation 1 needed to solve for the unique audience (A). While $A_{12}$ cannot be directly determined from the available information, $A_{12}$ can be estimated based on the covariance of the vectors of the sketch data 132*a-b* (e.g., a measure of variability in corresponding values in the two vectors). For example, once $A_{12}$ is estimated (e.g., using an estimator) then the cardinality of the union can also be estimated. Assuming X is the vector of counts for database proprietor A and Y is the vector of counts for database proprietor B, the covariance of the two vectors can be shown in accordance with Equation 4, with the covariance-estimator of $A_{12}$ defined in accordance with Equation 5:

$$\text{cov}(X, Y) = p(1-p)A_{12} \quad \text{Equation 4}$$

$$\widehat{A_{12}} = \frac{1}{c_2}\text{cov}(X, Y) \quad \text{Equation 5}$$

where $\widehat{A_{12}}$ is the estimate for $A_{12}$, X is the vector of counts for sketch data A 132*a*, Y is the vector of counts for sketch data B 132*b*, and $c_2=p(1-p)$, where p is the probability of a particular entry being assigned to a particular element within the vector of counts. As mentioned above, each entry has a 1/k probability of being selected. The expected value and the variance for the estimate $\widehat{A_{12}}$ may be defined mathematically by Equations 6 and 7:

$$E[\widehat{A_{12}}] = A_{12} \quad \text{Equation 6}$$

$$\text{Var}[\widehat{A_{12}}] = \frac{A_1A_2 + A_{12}^2}{k} \quad \text{Equation 7}$$

where k is the length of the vectors X and Y. According to Equation 5, the estimate $\widehat{A_{12}}$ for $A_{12}$ is unbiased. Further, as demonstrated by Equation 7, the variance decreases as the length of the vectors (k) increases. Thus, as the number of paired values (from each of the two vectors) increases, the estimate improves with a smaller variance. Knowing $A_1$ and $A_2$, the estimate of A, its expected value (e.g., E[Â]), and variance (e.g., Var [Â]) can thereby be expressed in accordance with Equations 8, 9, and 10, respectively:

$$\hat{A} = A_1 + A_2 - \widehat{A_{12}} \quad \text{Equation 8}$$

$$E[\hat{A}] = A \quad \text{Equation 9}$$

$$\text{Var}[\hat{A}] = \frac{A_1A_2 + A_{12}^2}{k} \quad \text{Equation 10}$$

When considering three datasets, there are multiple approaches that can be examined. For example, given three vector of counts, all pairs of counts may be assessed to produce an estimate of the paired-intersections and the results used to estimate the triple intersection. Given three vector of counts {X, Y, Z}, all three pairs would produce estimates corresponding to Equations 11, 12, and 13:

$$\widehat{A_{12}} = \frac{1}{c_2}\text{cov}(X, Y) \quad \text{Equation 11}$$

$$\widehat{A_{13}} = \frac{1}{c_2}\text{cov}(X, Z) \quad \text{Equation 12}$$

$$\widehat{A_{23}} = \frac{1}{c_2}\text{cov}(Y, Z) \quad \text{Equation 13}$$

However, the value of $A_{123}$ remains inestimable using Equations 11-13. For example, given the equalities shown in connection with Equation Set 1 (e.g., $A_{12}=n_{110}+n_{111}$, $A_{13}=n_{101}+n_{111}$, $A_{23}=n_{011}+n_{111}$, and $A_{123}=n_{111}$), the $A_{123}$ term is not extractable using the pairs of intersection cardinalities. As such, triple intersections can be included to incorporate another function (e.g., f(X, Y, Z)). For example, the covariance function can be defined in accordance with Equation 14 and expanded algebraically to Equation 15:

$$\text{cov}(X, Y) = E[(X - E[X])(Y - E[Y])] \quad \text{Equation 14}$$

$$\text{cov}(X, Y) = E[XY] - E[X]E[Y] \quad \text{Equation 15}$$

If the distributions are zero-meaned, then E[X]=E[Y]=0 and Equation 15 can be expressed in accordance with Equation 16:

$$\text{cov}(X,Y)=E[XY] \quad \text{Equation 16}$$

Although the resulting covariance is defined only for two random variables, the expected value across the multiplication of any number of random variables is well-defined. When the random variables are zero-meaned before the multiplication and expectation operator, these variables can be identified as central-moments. The $n^{th}$ central moment of a distribution X can further be defined in accordance with Equation 17:

$$u_n=E[(X-E[X])^n] \quad \text{Equation 17}$$

Assuming that $E[X'Y'Z'] \propto A_{123}$, the expected value of the mean-centered product across all three vectors is proportional to the triple intersection (e.g., the central product of two vectors (e.g., the covariance) is proportional to the double intersection). In examples disclosed herein, the central moment for two variables (e.g., E[X'Y']) is referred to as the covariance, where variance represents a special case (e.g., E[X'X']). Methods and apparatus disclosed herein for audience-based deduplication focus on the central moment of three variables (e.g., E[X'Y'Z']).

Following the reasoning of the two-database derivation, there can be a total of N elements that need to be allocated across k bins. While the true distribution is a multinomial (e.g., a joint distribution of the random counts across the k different bins), it can be shown that the distribution of any particular bin is distributed as a binomial. Assuming $X_i$ represents the distribution of the $i^{th}$ bin, when $X_i$~Bin (N, p), it follows that $E[X_i]=Np$. For example, if k=100 and N=1, 000, each individual bin is expected to have, on average, 10 counts. For large k and N, the Binomial distribution can be approximated with the Normal distribution as Bin (N, p)→ $\mathcal{N}$(Np, Np (1−p)), where N is the cardinality of either dataset (e.g., N equals either A or B). Thus, for example, plugging in either A or B for N and 1/n for p yields an approximation for the distribution of the vectors $V_A$ and $V_B$ for each of the sketch data A 132*a* and the sketch data B 132*b*. Accordingly, three distributions can be expressed as shown in connection with Equations 18, 19, and 20, which can further be mean-centered as shown in connection with Equations 21, 22, and 23:

$$X_i \sim \mathcal{N}\,A_1p,A_1p(1-p)) \quad \text{Equation 18}$$

$$Y_i \sim \mathcal{N}\,(A_2p,A_2p(1-p)) \quad \text{Equation 19}$$

$$Z_i \sim \mathcal{N}\,(A_3p,A_3p(1-p)) \quad \text{Equation 20}$$

$$X_i' \sim \mathcal{N}\,(0,A_1p(1-p)) \quad \text{Equation 21}$$

$$Y_i' \sim \mathcal{N}\,(0,A_2p(1-p)) \quad \text{Equation 22}$$

$$Z_i' \sim \mathcal{N}\,(0,A_3p(1-p)) \quad \text{Equation 23}$$

While expected values for any pairs yield an estimate of paired intersection cardinalities E[X'Y']=$c_2A_{12}$, the triple-central moment in this case is identically equal to zero E[X'Y'Z']=0, yielding that the Normal Distribution approximation is unable to estimate the triple-intersection cardinalities. Using a Binomial Distribution, the triple intersection cardinality can be estimated with the central moment triple product: E[X'Y'Z']=$c_3$ $A_{123}$, where $c_3$=(1−p)p (1−2p) and p=1/k, thereby yielding an estimate of $$\widehat{A_{123}} = \frac{1}{c_3}E[X'Y'Z'].$$

While the resulting estimate is unbiased and provides the correct estimator for $A_{123}$, the variance of the resulting estimate can be orders of magnitude off depending on input parameters. As such, the Binomial approximation produces the correct estimates and is unbiased, but also yields incorrect variances for those estimates. For example, while $X_i$~Bin (N, p) for i={1, . . . , k}, it is not true that cov ($X_i$, $X_j$)=0 for i={1, . . . , k}, j={1, . . . , k}. Given that the sum is constrained, the distribution per entry is Binomial and each entry is the same Binomial distribution throughout, but they are not in fact independent. As such, if more elements are assigned in one entry, then less elements must be assigned to other entries, producing a negative correlation between the entries. These negative correlations, taken together, reduce the variance of the estimate. To maintain a good variance, the correct derivation for a set of three datasets can instead be obtained as follows: The multinomial distribution, X~Mult (n, p) for some scalar integer n and probability vector p can be defined as the probability of obtaining the random allocation of ($n_1$, . . . , $n_k$) balls across k different bins where the $$n = \sum_{i=1}^{k} n_i$$

balls are allocated such that the probability of landing in bin i has a probability $p_i$ of being selected, with $$\sum_{i=1}^{k} p_i = 1.$$

Although represented as symbol $X_i$ the multinomial distribution is a joint-distribution of dimension k. The expected value and covariance matrix can therefore be derived in accordance with Equations 24, 25, and 26:

$$E(X_i)=np_i \quad \text{Equation 24}$$

$$\mathrm{Var}(X_i)=np_i(1-p_i) \quad \text{Equation 25}$$

$$\mathrm{Cov}(X_i,X_j)=-np_ip_j(i\neq j) \quad \text{Equation 26}$$

When $p_i$=1/k for all i={1, . . . , k}, the allocation can be considered to be uniform, which is identical to flipping a fair coin (k=2) or rolling a single fair die (k=6). For three datasets, there are seven mutually exclusive and exhaustive combinations any element can belong to. Each one has its own probabilistic allocation across the datasets. The seven individual k-dimensional multinomials can be defined as shown below:

$$\mathcal{D}_{001} \sim \mathrm{Mult}(n_{001},\vec{p})$$

$$\mathcal{D}_{010} \sim \mathrm{Mult}(n_{010},\vec{p})$$

$$\mathcal{D}_{011} \sim \mathrm{Mult}(n_{011},\vec{p})$$

$$\mathcal{D}_{100} \sim \mathrm{Mult}(n_{100},\vec{p})$$

$$\mathcal{D}_{101} \sim \mathrm{Mult}(n_{101},\vec{p})$$

$$\mathcal{D}_{110} \sim \mathrm{Mult}(n_{110},\vec{p})$$

$$\mathcal{D}_{111} \sim \mathrm{Mult}(n_{111},\vec{p})$$

The total counts being allocated, per dataset, can be expressed in accordance with Equations 27-29:

$$A_1 = n_{100} + n_{101} + n_{110} + n_{111} \quad \text{Equation 27}$$

$$A_2 = n_{010} + n_{011} + n_{110} + n_{111} \quad \text{Equation 28}$$

$$A_3 = n_{001} + n_{011} + n_{101} + n_{111} \quad \text{Equation 29}$$

For notational convenience, the vector of counts for $A_1$ can be expressed as X, the vector of counts for $A_2$ can be expressed as Y, and the vector of counts for $A_3$ can be expressed as Z, where ⊕ represents component-wise addition across the k-dimensional distributions listed:

$$X \sim \mathcal{D}_{100} \oplus \mathcal{D}_{101} \oplus \mathcal{D}_{110} \oplus \mathcal{D}_{111}$$

$$Y \sim \mathcal{D}_{010} \oplus \mathcal{D}_{011} \oplus \mathcal{D}_{110} \oplus \mathcal{D}_{111}$$

$$Z \sim \mathcal{D}_{001} \oplus \mathcal{D}_{011} \oplus \mathcal{D}_{101} \oplus \mathcal{D}_{111}$$

As such, the observed vector of counts from each of the three datasets can be expressed and if an element is in all three datasets, the element can be allocated to the same entry across all three vectors of counts, since $\mathcal{D}_{111}$ is the same single random sample across all three datasets and not three different independent samples of the same distribution. Likewise, ⊕ represents component-wise addition of the four random samples across the k entries, and not the sum of four independent random variables.

Furthermore, the expected value number of counts per bin (out of k) would be 1/$k^{th}$ of the total. If these values are identified as {$m_1$, $m_2$, $m_3$} respectively, with $m_i$=$A_i$/k, then zero-centered distributions can be defined as follows, where ⊖ represents component-wise subtraction:

$$X' \sim X \ominus m_1$$

$$Y' \sim Y \ominus m_2$$

$$Z' \sim Z \ominus m_3$$

Whereas $$\sum_{i=1}^{k} X_i = A_1,\ \sum_{i=1}^{k} X_i' = 0$$

and a joint distribution can be constructed using $V \sim \{V_1, V_2, V_3, V_4, V_5, V_6, V_7\}$ with the formulas for each component corresponding to Equations 30-36, where $c_2$=p (1−p), $c_3$=p (1−p)(1-2p), p=1/k, and where $X'_i$ is the $i^{th}$ component of the k-dimensional distribution $X'_i$, where $Y'_i$ is the $i^{th}$ component of the k-dimensional distribution $Y'_i$, and where $Z'_i$ is the $i^{th}$ component of the k-dimensional distribution $Z'_i$.

$$V_1 = \frac{1}{c_2}\left(\frac{1}{k}\sum_{i=1}^{k} X'_{(i)} X'_{(i)}\right) \quad \text{Equation 30}$$

$$V_2 = \frac{1}{c_2}\left(\frac{1}{k}\sum_{i=1}^{k} Y'_{(i)} Y'_{(i)}\right) \quad \text{Equation 31}$$

$$V_3 = \frac{1}{c_2}\left(\frac{1}{k}\sum_{i=1}^{k} Z'_{(i)} Z'_{(i)}\right) \quad \text{Equation 32}$$

$$V_4 = \frac{1}{c_2}\left(\frac{1}{k}\sum_{i=1}^{k} X'_{(i)} Y'_{(i)}\right) \quad \text{Equation 33}$$

$$V_5 = \frac{1}{c_2}\left(\frac{1}{k}\sum_{i=1}^{k} X'_{(i)} Z'_{(i)}\right) \quad \text{Equation 34}$$

$$V_6 = \frac{1}{c_2}\left(\frac{1}{k}\sum_{i=1}^{k} Y'_{(i)} Z'_{(i)}\right) \quad \text{Equation 35}$$

$$V_7 = \frac{1}{c_3}\left(\frac{1}{k}\sum_{i=1}^{k} X'_{(i)} Y'_{(i)} Z'_{(i)}\right) \quad \text{Equation 36}$$

Furthermore, E(V) can be expressed in disjoint cardinalities as the construction of the multinomials are enumerated and defined using those cardinalities: E(V)={$n_{100}$+$n_{101}$+$n_{110}$+$n_{111}$, $n_{010}$+$n_{011}$+$n_{110}$+$n_{111}$, $n_{001}$+$n_{011}$+$n_{101}$+$n_{111}$, $n_{110}$+$n_{111}$, $n_{101}$+$n_{111}$, $n_{011}$+$n_{111}$, $n_{111}$}. Based on the definitions of first, second, or third order intersection cardinalities ($A_1$, $A_{13}$, $A_{123}$ for example), then E(V)={$A_1$, $A_2$, $A_3$, $A_{12}$, $A_{13}$, $A_{23}$, $A_{123}$} and the expected value of individual components of the seven dimensional distribution of Vis an unbiased estimate of each first, second, or third order intersection cardinality. In some examples, the covariance matrix of V can also be computed, as described in more detail below, where the covariance matrix is represented in intersection cardinality notation ({A}) for algebraic simplicity and not in the disjoint cardinality notation ({n}) used for the derivation. In examples disclosed herein, there is a one-to-one equivalence between the two sets of cardinalities as the seven variables. In some examples, a linear transformation from ({A}) to ({n}) can be performed to obtain an unbiased estimate of the disjoint cardinalities, as shown in more detail below in connection with the covariance matrix of the disjoint cardinality estimations.

Condensed notation representations of the covariance matrix between different dimensions of the joint distribution of intersection cardinalities can be based on a left-hand side that represents which two variables are being compared for their covariance and a right-hand side that represents the numerator of the covariance expression, with (k−1) being the denominator in all cases, as shown in connection with Equations 37:

$$Cov[\widehat{A_1}, \widehat{A_{12}}] = \frac{-2A_{12} + 2A_1A_{12}}{k-1} \quad \text{Equation 37}$$

The covariance matrix entries can be assigned as shown below, where Equation 37 is represented as {[1],[12]}: −2[12]+2[1][12]:

{[1],[1]}: −2[1]+2[1]$^2$
{[1],[2]}: −2[12]+2[12]$^2$
{[1],[3]}: −2[13]+2[13]$^2$
{[1],[12]}: −2[12]+2[1][12]
{[1],[13]}: −2[13]+2[1][13]
{[1],[23]}: −2[123]+2[12][13]
{[1],[123]}: −6[123]+2[1][123]+4[12][13]
{[2],[2]}: −2[2]+2[2]2
{[2],[3]}: −2[23]+2[23]2
{[2],[12]}: −2[12]+2[12][2]
{[2],[13]}: −2[123]+2[12][23]
{[2],[23]}: −2[23]+2[2][23]
{[2],[123]}: −6[123]+2[123][2]+4[12][23]
{[3],[3]}: −2[3]+2[3]2
{[3],[12]}: −2[123]+2[13][23]
{[3],[13]}: −2[13]+2[13][3]
{[3],[23]}: −2[23]+2[23][3]
{[3],[123]}: −6[123]+4[13][23]+2[123][3]
{[12],[12]}: −2[12]+[12]$^2$+[1][2]
{[12],[13]}: −2[123]+[12][13]+[1][23]
{[12],[23]}: −2[123]+[13][2]+[12][23]
{[12],[123]}: −6[123]+2[12][123]+[12][13]+[13][2]+[1][23]+[12][23]
{[13],[13]}: −2[13]+[13]$^2$+[1][3]
{[13],[23]}: −2[123]+[13][23]+[12][3]
{[13],[123]}: −6[123]+[12][13]+2[123][13]+[1][23]+[13][23]+[12][3]
{[23],[23]}: −2[23]+[23]$^2$+[2][3]
{[23],[123]}: −6[123]+[13][2]+[12][23]+2[123][23]+[13][23]+[12][3]
{[123],[123]}: −18[123]+2[12][123]+3[123]$^2$+2[12][13]+2[123][13]+[13][2]+[1][23]+2[12][23]+2[123][23]+2[13][23]+[12][3]

In the covariance matrix entries shown above, all formulas given are exact except for {[123], [123]}, which represents Var$\widehat{A_{12}}$ and is approximately true for large k. The correct expression is composed of two parts, one divided by k−1 and another by k−2. For large enough k, the denominators are roughly equivalent and the numerators can be combined to what is shown above. For completeness, the correct expression is shown below in connection with Equation 38, where $M_1$=−30[123]+6[12][123]+3[123]$^2$+2[12][13]+6[123][13]+3[13][2]−[13]$^2$[2]+3[1][23]+2[12][23]+6[123][23]+2[13][23]−2[12][13][23]−[1][23]$^2$+3[12][3]−[12]$^2$[3]−[1][2][3] and $M_2$=+12[123]−4[12][123]−4[123][13]−2[13][2]+[13]$^2$[2]−2[1][23]−4[123][23]+2[12][13][23]+[1][23]$^2$−2[12][3]+[12]$^2$[3]+[1][2][3]:

$$\mathrm{Var}[\widehat{A_{123}}] = Cov[\widehat{A_{123}}, \widehat{A_{123}}] = \frac{M_1}{k-1} + \frac{M_2}{k-2} \quad \text{Equation 38}$$

For large k, two numerators can be combined to produce $M_0$=$M_1$+$M_2$, where $M_0$=−18[123]+2[12][123]+3[123]$^2$+2[12][13]+2[123][13]+[13][2]+[1][23]+2[12][23]+2[123][23]+2[13][23]+[12][3], which is identical to the expression given in the covariance matrix entries for {[123], [123]}.

As described above, the derivation for three datasets (e.g., three different sets of sketch data) uses the full multinomial distribution with all the correlations within, where the expected values are the same as the Binomial distribution, but the covariance matrix between each estimate now achieves accuracy. A numerical Monte Carlo experiment illustrating the differences between the full theory presented herein and the two different approximations can be shown as follows: For a vector of length k=128, cardinalities can be chosen independently from a discrete uniform distribution on the domain {1, . . . , $10^4$}, such as $n_{001}$=9,578, $n_{010}$=7, 980, $n_{011}$=5,048, $n_{100}$=4,752, $n_{101}$=7,491, $n_{110}$=3,891, and $n_{111}$=6,513. These cardinalities represent the true, but unknown, cardinalities within the set of mutually exclusive partitions. Any cardinality of interest is a combination of the above. The cardinalities of particular concern are the single, double, and triple cardinalities which numerically equal $A_1$=22,647, $A_2$=23,432, $A_3$=28,630, $A_{12}$=10,404, $A_{13}$=14, 004, $A_{23}$=11, 561, and $A_{123}$=6,513. A Monte Carlo experiment can be repeated numerous times (e.g., 10,000 times) to obtain the joint estimate of {$A_1$, $A_2$, $A_3$, $A_{12}$, $A_{13}$, $A_{23}$, $A_{123}$}. For example, the sample average across a total of 10,000 experiments yields an estimate of the expected value of the vector of counts methodology disclosed herein, as shown in connection with an unbiased estimate of the true cardinalities. For example, numerical values of the sample average are given as follows: $\widehat{A_{12}}$=22,634.3, $\widehat{A_{12}}$=23, 470.9, $\widehat{A_{12}}$=28,649.9, $\widehat{A_{12}}$=10,407.6, $\widehat{A_{12}}$=14,000.7, $\widehat{A_{12}}$=11,581.4, $\widehat{A_{12}}$=6,184.51. The 7×7 covariance matrix across the 10,000 experiments is an estimate of the actual theoretical covariance. In the example of Table 1, the elements of that sample covariance along with the theoretically derived expressions are compared, in addition to the covariances which would have been obtained under two different approximations used in the theory in connection with two-way dataset duplication and the theory applied directly to three datasets. In the example of Table 1, all values within the table are in multiples of $10^6$ for readability.

TABLE 1

Comparison of Covariances

| Covariance entry | Simulation | Theoretical | Binomial | Normal |
|---|---|---|---|---|
| {[1], [1]} | 7.908 | 8.077 | 8.036 | 8.014 |
| {[1], [2]} | 1.682 | 1.704 | 1.701 | 1.691 |
| {[1], [3]} | 3.044 | 3.088 | 3.078 | 3.064 |
| {[1], [12]} | 3.642 | 3.710 | 3.692 | 3.682 |
| {[1], [13]} | 4.901 | 4.994 | 4.969 | 4.955 |
| {[1], [23]} | 2.253 | 2.294 | 2.283 | 2.277 |
| {[1], [123]} | 5.910 | 6.911 | 11.186 | 0 |
| {[2], [2]} | 8.776 | 8.646 | 8.602 | 8.579 |
| {[2], [3]} | 2.129 | 2.105 | 2.099 | 2.088 |
| {[2], [12]} | 3.874 | 3.839 | 3.819 | 3.809 |
| {[2], [13]} | 1.909 | 1.894 | 1.886 | 1.879 |
| {[2], [23]} | 4.301 | 4.266 | 4.244 | 4.233 |
| {[2], [123]} | 9.278 | 6.191 | 10.592 | 0 |
| {[3], [3]} | 12.727 | 12.908 | 12.835 | 12.807 |
| {[3], [12]} | 2.567 | 2.550 | 2.536 | 2.530 |
| {[3], [13]} | 6.227 | 6.314 | 6.278 | 6.265 |
| {[3], [23]} | 5.170 | 5.212 | 5.183 | 5.172 |
| {[3], [123]} | 8.063 | 8.035 | 12.836 | 0 |
| {[12], [12]} | 5.005 | 5.031 | 5.001 | 4.991 |
| {[12], [13]} | 3.170 | 3.209 | 3.190 | 3.184 |
| {[12], [23]} | 3.466 | 3.531 | 3.510 | 3.503 |
| {[12], [123]} | 8.878 | 7.806 | 10.359 | 0 |
| {[13], [13]} | 6.586 | 6.649 | 6.611 | 6.598 |
| {[13], [23]} | 3.567 | 3.620 | 3.598 | 3.592 |
| {[13], [123]} | 7.767 | 8.265 | 11.322 | 0 |
| {[23], [23]} | 6.316 | 6.335 | 6.296 | 6.285 |
| {[23], [123]} | 8.744 | 8.337 | 11.070 | 0 |
| {[123], [123]} | 1,872.960 | 1,848.21 | 3,153.430 | 3,131.72 |

In the example of Table 1, any covariance expression involving a triple interaction within the normal distribution approximation is exactly equal to zero. However, the triple interaction belongs to every other set and so must be correlated in the illustrated example. The triple-interaction cardinality is not estimable within the normal distribution theory, and therefore it is uncorrelated with every other cardinality, resulting in the zeros observed in the example of Table 1. However, other than the elements which contain triple interaction, the normal distribution and the binomial distribution approximations agree reasonably well with each other. Furthermore, in the example of Table 1, neither approximations match the simulation for covariances which include the triple-interaction (e.g., component {[123], [123]}). However, Monte Carlo results associated with the full theory presented herein and the simulation are in agreement with each other (e.g., including the component {[123], [123]}).

Furthermore, a more striking comparison occurs when applying linear transformation on the data, going from the set {$A_1$, $A_2$, $A_3$, $A_{12}$, $A_{13}$, $A_{23}$, $A_{123}$} to the mutually exclusive set {$n_{001}$, $n_{010}$, $n_{011}$, $n_{100}$, $n_{101}$, $n_{110}$, $n_{111}$}. For example, the sample average of the Monte Carlo experiment, post linear-transformation can be identified as follows, in comparison to the true values shown above: $\hat{n}_{001}$=9, 252.34, $\hat{n}_{010}$=7,666.27, $\hat{n}_{011}$=5,396.94, $\hat{n}_{100}$=4,410.47, $\hat{n}_{101}$=7,816.15, $\hat{n}_{110}$=4,223.14, and $\hat{n}_{111}$=6,184.51. An analogous 7×7 covariance matrix for the set {n***} can also be obtained among the simulations and theory. For example, for a linear transformation the covariance matrix transforms in a quadratic form. The agreement of the theoretical formulas with the simulation is quite significant, and both differ dramatically with the binomial and normal distribution approximation theory, as shown in more detail in connection with Table 2:

TABLE 2

Comparison of Covariances Based on Matrix Position

| Matrix Position | Simulation | Theoretical | Binomial | Normal |
|---|---|---|---|---|
| {[001], [001]} | 1.866 | 1.841 | 3.144 | 3.142 |
| {[001], [010]} | 1.861 | 1.835 | 3.138 | 3.137 |
| {[001], [011]} | −1.860 | −1.836 | −3.138 | −3.136 |
| {[001], [100]} | 1.858 | 1.831 | 3.137 | 3.136 |
| {[001], [101]} | −1.861 | −1.835 | −3.136 | −3.136 |
| {[001], [110]} | −1.860 | −1.836 | −3.138 | −3.136 |
| {[001], [111]} | 1.865 | 1.840 | 3.144 | 3.132 |
| {[010], [010]} | 1.867 | 1.839 | 3.143 | 3.142 |
| {[010], [011]} | −1.861 | −1.836 | −3.137 | −3.137 |
| {[010], [100]} | 1.859 | 1.834 | 3.137 | 3.137 |
| {[010], [101]} | −1.862 | −1.835 | −3.136 | −3.137 |
| {[010], [110]} | −1.860 | −1.835 | −3.137 | −3.136 |
| {[010], [111]} | 1.865 | 1.838 | 3.143 | 3.132 |
| {[011], [011]} | 1.862 | 1.838 | 3.138 | 3.138 |
| {[011], [100]} | −1.858 | −1.836 | −3.137 | −3.137 |
| {[011], [101]} | 1.860 | 1.835 | 3.135 | 3.135 |
| {[011], [110]} | 1.859 | 1.836 | 3.136 | 3.135 |
| {[011], [111]} | −1.864 | −1.840 | −3.142 | −3.132 |
| {[100], [100]} | 1.860 | 1.836 | 3.141 | 3.140 |
| {[100], [101]} | −1.859 | −1.836 | −3.136 | −3.137 |
| {[100], [110]} | −1.858 | −1.836 | −3.137 | −3.136 |
| {[100], [111]} | 1.862 | 1.839 | 3.143 | 3.132 |
| {[101], [101]} | 1.864 | 1.838 | 3.137 | 3.138 |
| {[101], [110]} | 1.859 | 1.835 | 3.135 | 3.135 |
| {[101], [111]} | −1.865 | −1.840 | −3.142 | −3.132 |
| {[110], [110]} | 1.860 | 1.838 | 3.138 | 3.137 |
| {[110], [111]} | −1.864 | −1.840 | −3.143 | −3.132 |
| {[111], [111]} | 1.873 | 1.848 | 3.153 | 3.132 |

Having incorrect covariance expressions or an incorrect variance of the triple-intersection term itself can have a significant impact on the stated precision of the total cardinality estimate. By definition we have either by inclusion-exclusion (A*), or by straight addition of the mutually exclusive partitions (n***), an expression for the full cardinality between three datasets as follows: $A=A_1+A_2+A_3-A_{12}-A_{13}-A_{23}+A_{123}=n_{001}+n_{010}+n_{011}+n_{100}+n_{101}+n_{110}+n_{111}$. When all quantities are unknown, all quantities can be estimated as follows: $\hat{A}=\hat{A}_1+\hat{A}_2+\hat{A}_3-\hat{A}_{12}-\hat{A}_{13}-\hat{A}_{23}+\hat{A}_{123}=\hat{n}_{001}+\hat{n}_{010}+\hat{n}_{011}+\hat{n}_{100}+\hat{n}_{101}+\hat{n}_{110}+\hat{n}_{111}$. The variance of the estimate is not the sum of the individual variances, as they are correlated, and the full covariance matrix must be considered in the illustrated example. The observed values for such a numerical experiment are A=45,253 (truth) and $\hat{A}$=44,949.8 (simulation) with observed variance and standard deviation shown in accordance with Table 3:

TABLE 3

Observed Variance and Standard Deviation

| Method | Var ($\hat{A}$) ($\times 10^9$) | Std ($\hat{A}$) |
|---|---|---|
| Simulation | 1.88043 | 43,363.9 |
| Theoretical | 1.85368 | 43,054.4 |
| Binomial Approx. | 3.16911 | 56,294.9 |
| Normal Approx. | 3.14364 | 56,068.1 |

Provided the above, the correct estimates for a set of three datasets (e.g., three sets of sketch data) are as follows: Let {X, Y, Z} represent the set of the vector of counts, where {X', Y', Z'} represent mean-centered vectors. The central-moment estimator can be defined as $$E[X'Y'] = c_2 A_{12} \rightarrow \hat{A}_{12} = \frac{1}{c_2} E[X'Y']$$

and the third-order central-moment can be correctly identified as $$E[X'Y'Z'] = c_3 A_{123} \rightarrow \hat{A}_{123} = \frac{1}{c_3} E[X'Y'Z'].$$

In other words, if we construct the joint distribution across the seven estimates $V\sim\{V_1, V_2, V_3, V_4, V_5, V_6, V_7\}$ with the formulas for each component represented by Equations 39-45, where $$c_2 = p(1-p),\ c_3 = p(1-p)(1-2p),\ p = \frac{1}{k},$$

and the overbar designates a sample-average:

$$V_1 = \frac{1}{c_2}\overline{X'X'} \quad \text{Equation 39}$$

$$V_2 = \frac{1}{c_2}\overline{Y'Y'} \quad \text{Equation 40}$$

$$V_3 = \frac{1}{c_2}\overline{Z'Z'} \quad \text{Equation 41}$$

$$V_4 = \frac{1}{c_2}\overline{X'Y'} \quad \text{Equation 42}$$

$$V_5 = \frac{1}{c_2}\overline{X'Z'} \quad \text{Equation 43}$$

-continued $$V_6 = \frac{1}{c_2}\overline{Y'Z'} \quad \text{Equation 44}$$

$$V_7 = \frac{1}{c_2}\overline{X'Y'Z'} \quad \text{Equation 45}$$

For example, $E[V]=\{A_1, A_2, A_3, A_{12}, A_{13}, A_{23}, A_{123}\}$ and the expected value of V is an unbiased estimate to the true intersection cardinalities. As described above, the covariance matrix of that distribution is more involved, given that it is a 7×7 matrix. To obtain $c_2$ and $c_3$, X can be represented as X Bin(N, p), such that the $n^{th}$ central moment of a distribution X can be defined as $\mu_n=E[(X-E[X])^n]$, which for the binomial distribution can be represented as $\mu_1=0$, $\mu_2=N(1-)p$, $\mu_3=N(1-p)p(1-2p)$, $\mu_4=N(1-p)p(1+3(N-2)(1-p)p)$, and $p_5=N(1-p)p\ (1-2p)(1-2(6-5N)(1-p)p)$. In examples disclosed herein, $\mu_2$ and $\mu_3$ are proportional to N by some factor, but $\mu_4$ and higher involves a more complicated expression of N. The higher intersection cardinalities could be estimated by solving for such an N for each sampled central-moment estimator by using a quadratic equation or other root-finding technique, but such an approach does not identify statistical properties such as unbiasedness or variance expressions. In examples disclosed herein, the second and third moments can be simplified by defining proportionality constants $c_2$ and $c_3$ such that $\mu_2=N(1-p)p=N\ c_2$ and $\mu_3=N\ (1-p)p\ (1-2p)=N\ c_3$, thereby yielding $c_2=(1-p)p$ and $c_3=(1-p)p\ (1-2p)$ as the different proportionality constants that can be used to obtain an estimate of N given the central-moments. In examples disclosed herein, the vector of counts variable Nis general for any {A} intersection cardinality.

Based on the derivations disclosed herein, a vector of counts-based estimate for a total of three datasets can be identified as shown using the following example: True but unknown cardinalities (e.g., $n_{001}$=43,900, $n_{010}$=11,800, $n_{011}$=81,100, $n_{100}$=5,200, $n_{101}$=37,700, $n_{110}$=47,400, $n_{111}$=80,900) can be used to yield true but unknown intersection cardinalities (e.g., $A_1$=171,200, $A_2$=221,200, $A_3$=243,600, $A_{12}$=128,300, $A_{13}$=118,600, $A_{23}$=162,000, and $A_{123}$=80,900). For example, a database proprietor (e.g., database proprietor A of FIG. 1) that owns the first dataset has 171,200 elements, the second dataset has 221,200 elements, etc. Among all three datasets (e.g., sketch data 132*a-c*) there are 80,900 elements that are shared across all three of the datasets. While each database proprietor would know their own dataset size (e.g., $A_1$=171,200), the database proprietors would not know how many elements are shared across their dataset (e.g., sketch data 132*a*) and the other datasets (e.g., sketch data 132*b-c*). In some examples, all three database proprietors produce a vector of counts, agreeing on the same length of vector (k), hash function, and methodology converting the given hashed value to an entry bin. In some examples, these raw vectors of counts can still be maintained internally (e.g., if shared, $\{A_1, A_2, A_3\}$ can be identified using summation). Once the database proprietors agree to a length of vector k (e.g., k=100), each vector of count would produce a vector of length 100, as shown below:

X={1702, 1759, 1706, 1751, 1692, 1783, 1738, 1670, 1786, 1694, 1679, 1757, 1702, 1763, 1675, 1769, 1788, 1680, 1729, 1676, 1667, 1717, 1692, 1668, 1704, 1651, 1737, 1656, 1705, 1683, 1685, 1670, 1762, 1711, 1686, 1692, 1658, 1650, 1706, 1713, 1727, 1728, 1722, 1758, 1725, 1718, 1708, 1691, 1734, 1751, 1785, 1823, 1708, 1690, 1723, 1701, 1654, 1653, 1730, 1727, 1674, 1753, 1745, 1706, 1686, 1700, 1686, 1642, 1709, 1765, 1742, 1711, 1689, 1740, 1711, 1673, 1645, 1594, 1681, 1700, 1716, 1772, 1725, 1676, 1721, 1721, 1635, 1833, 1751, 1735, 1819, 1711, 1730, 1657, 1695, 1684, 1732, 1722, 1707, 1738}

Y={2227, 2288, 2185, 2267, 2265, 2307, 2233, 2213, 2289, 2134, 2277, 2207, 2182, 2309, 2246, 2245, 2285, 2294, 2205, 2179, 2230, 2169, 2192, 2243, 2252, 2181, 2225, 2119, 2247, 2164, 2145, 2213, 2311, 2182, 2201, 2168, 2174, 2154, 2138, 2202, 2213, 2238, 2192, 2253, 2193, 2206, 2162, 2220, 2224, 2215, 2221, 2341, 2211, 2116, 2236, 2213, 2138, 2216, 2211, 2258, 2214, 2270, 2205, 2134, 2192, 2198, 2173, 2182, 2276, 2226, 2225, 2237, 2155, 2201, 2180, 2174, 2140, 2080, 2186, 2227, 2161, 2292, 2223, 2209, 2139, 2159, 2157, 2228, 2216, 2266, 2302, 2209, 2227, 2239, 2205, 2126, 2270, 2193, 2226, 2254}

Z={2455, 2512, 2431, 2523, 2442, 2510, 2501, 2415, 2473, 2394, 2470, 2509, 2380, 2432, 2435, 2520, 2523, 2510, 2490, 2345, 2449, 2367, 2402, 2433, 2457, 2430, 2489, 2349, 2442, 2434, 2409, 2400, 2458, 2391, 2401, 2450, 2402, 2394, 2450, 2381, 2416, 2431, 2435, 2453, 2472, 2412, 2417, 2409, 2431, 2509, 2498, 2540, 2417, 2411, 2404, 2483, 2375, 2381, 2439, 2459, 2458, 2416, 2440, 2396, 2450, 2433, 2413, 2433, 2432, 2413, 2405, 2436, 2364, 2424, 2440, 2345, 2361, 2302, 2408, 2477, 2482, 2481, 2416, 2399, 2426, 2355, 2420, 2488, 2432, 2462, 2511, 2379, 2450, 2472, 2480, 2368, 2488, 2460, 2476, 2459}.

Using the produced vectors, the database proprietors can mean-center their individual vector of counts. However, if values within X' are summed, the result would be zero and would not provide the dataset size, which would otherwise be obtained by summing the vectors of X (e.g., equivalent to $A_1$). As such, the zero-meaned vectors shown below can be used by each database proprietor to share for further cardinality estimation (e.g., using a third-party):

X'={−10, 47, −6, 39, −20, 71, 26, −42, 74, −18, −33, 45, −10, 51, −37, 57, 76, −32, 17, −36, −45, 5, −20, −44, −8, −61, 25, −56, −7, −29, −27, −42, 50, −1, −26, −20, −54, −62, −6, 1, 15, 16, 10, 46, 13, 6, −4, −21, 22, 39, 73, 111, −4, 22, 11, −11, −58, −59, 18, 15, −38, 41, 33, −6, −26, −12, −26, −70, −3, 53, 30, −1, −23, 28, −1, −39, −67, −118, −31, −12, 4, 60, 13, −36, 9, 9, −77, 121, 39, 23, 107, −1, 18, −55, −17, −28, 20, 10, −5, 26}

Y'={15, 76, −27, 55, 53, 95, 21, 1, 77, −78, 65, −5, −30, 97, 34, 33, 73, 82, −7, −33, 18, −43, −20, 31, 40, −31, 13, −93, 35, −48, −67, 1, 99, −30, −11, −44, −38, −58, −74, −10, 1, 26, −20, 41, −19, −6, −50, 8, 12, 3, 9, 129, −1, −96, 24, 1, −74, 4, −1, 46, 2, 58, −7, −78, −20, −14, −39, −30, 64, 14, 13, 25, −57, −11, −32, −38, −72, −132, −26, 15, −51, 80, 11, −3, −73, −53, −55, 16, 4, 54, 90, −3, 15, 27, −7, −86, 58, −19, 14, 42}

Z'={19, 76, −5, 87, 6, 74, 65, −21, 37, −42, 34, 73, −56, −4, −1, 84, 87, 74, 54, −91, 13, −69, −34, −3, 21, −6, 53, −87, 6, −2, −27, −36, 22, −45, −35, 14, −34, −42, 14, −55, −20, −5, −1, 17, 36, −24, −19, −27, −5, 73, 62, 104, −19, −25, −32, 47, −61, −55, 3, 23, 22, −20, 4, −40, 14, −3, −23, −3, −4, −23, −31, 0, −72, −12, 4, −91, −75, −134, −28, 41, 46, 45, −20, −37, −10, −81, −16, 52, −4, 26, 75, −57, 14, 36, 44, −68, 52, 24, 40, 23}

Furthermore, give $$p = \frac{1}{100},$$

the proportionality constants can be determined as $c_2$=(1−p)p=0.0099 and $c_3$=(1−p)p (1-2p)=0.009702. Based on the result for the proportionality constants, an example calculation for cardinality estimation can be determined using Equation 42:

$$\hat{A}_{12} = V_4 = \frac{1}{c_2}\overline{X'Y'} = \frac{1}{0.0099}\left(\frac{1}{100}((-10)(15) + \ldots + (26)(42))\right) = 127{,}382.$$

Accordingly, the estimates for all intersection cardinalities can be determined as follows based on the covariance matrix formulas of the joint distribution for all seven estimates: $\hat{A}_1$=176,624, $\hat{A}_2$=245,188, $\hat{A}_3$=217,410, $\hat{A}_{12}$=127,382, $\hat{A}_{13}$=120,131, $\hat{A}_{23}$=153,139, $\hat{A}_{123}$=71,860. In some examples, the full cardinality across all datasets can be estimated, along with the variance of that estimate, as described in more detail below. However, assuming that everything, including the single-intersection cardinalities of {$A_1$, $A_2$, $A_3$} are unknown, A=308,00 (truth) and Â=310,430 (vector of counts), with the true variance (e.g., using the true but unknown values) and the estimated variance (e.g., using the estimates of set {A}) yielding Var [Â]=2.65896×$10^{12}$ and $\widehat{A_{12}}$ =2.61143×$10^{12}$. In some examples, disjoint cardinalities can be estimated instead of intersection cardinalities. While the two sets of cardinalities are one-to-one and in a sense equivalent, anything that can be computed with one set can also be computed with the other (e.g., using a simple linear transform). Based on the method set forth herein, the final linear transformed estimates (e.g., unbiased estimates of the joint cardinalities themselves) are $\hat{n}_{001}$=16,000, $\hat{n}_{010}$=36,527, $\hat{n}_{011}$=81,279, $\hat{n}_{100}$=972, $\hat{n}_{101}$=48,271, $\hat{n}_{110}$=55, 521, $\hat{n}_{111}$=71,860.

Although the vector of counts methodology disclosed herein produces unbiased estimates of the intersection cardinality quantities {$A_1$, $A_2$, $A_3$, $A_{12}$, $A_{13}$, $A_{23}$, $A_{123}$}, in some cases the disjoint cardinalities {$n_{001}$, $n_{010}$, $n_{011}$, $n_{100}$, $n_{101}$, $n_{110}$, $n_{111}$} may be more appropriate. An unbiased estimate of those quantities can be determined by a simple linear transformation given from the set {A} to the set {n}. The covariance matrix of that transformation can be achieved in quadratic form. One benefit of using the mutually exclusive set is that any quantity of interest in relation to the Venn diagram is a simple sum of those sets, so there is no need to use the principle of inclusion-exclusions given that objects are not double-counted. For example, the left-hand side of the covariance matrix shown in the example of Equation 46 represents the two variances that are being compared for their covariance, while the right-hand side represents the numerator of the covariance expressions with (k−1) being the denominator in all cases, where the symbol n*is represented as [*] and the numbers not in brackets are coefficients:

$$Cov[\hat{n}_{001}, \hat{n}_{010}] = \frac{-2n_{110} + 2n_{110}^2 - 2n_{111} + 4n_{110}n_{111} + 2n_{111}^2}{k-1} \quad \text{Equation 47}$$

The covariance matrix of Equation 47 can be expressed as {[001], [010]}: −2[110]+2[110]2−2[111]+4[110][111]+2 [111]2. The full version of the covariance matrix entries associated with disjoint cardinalities is shown below:

{[001], [001]}:−2[100]+2[100]$^2$−2[101]+4[100][101]+2[101]$^2$−2[110]+4[100][110]+4[101][110]+2[110]$^2$−2[111]+4[100][111]+4[101][111]+4[110][111]+2[111]$^2$

{[001], [010]}:−2[110]+2$[110]^2$−2[111]+4[110][111]+2$[111]^2$

{[001], [011]}:−2[101]+2[101]2−2[111]+4[101][111]+2[111]2

{[001], [100]}: −2[110]+2[100][110]+2[101][110]+2$[110]^2$−2[111]+2[100][111]+2[101][111]+4[110][111]+2$[111]^2$

{[001], [101]}: −2[101]+2[100][101]+2$[101]^2$+2[101][110]−2[111]+2[100][111]+4[101][111]+2[110][111]+2$[111]^2$

{[001], [110]}: 2[101][110]−2[111]+2[101][111]+2[110][111]+2$[111]^2$

{[001], [111]}: 4[101][110]−6[111]+2[100][111]+6[101][111]+6[110][111]+6$[111]^2$

{[010], [010]}: −2[010]+2$[010]^2$−2[011]+4[010][011]+2$[011]^2$−2[110]+4[010][110]+4[011][110]+2$[110]^2$−2[111]+4[010][111]+4[011][111]+4[110][111]+2[111]2

{[010], [011]}: −2[011]+2$[011]^2$−2[111]+4[011][111]+2$[111]^2$

{[010], [100]}: −2[110]+2[010][110]+2[011][110]+2$[110]^2$−2[111]+2[010][111]+2[011][111]+4[110][111]+2$[111]^2$

{[010], [101]}: 2[011][110]−2[111]+2[011][111]+2[110][111]+2$[111]^2$

{[010], [110]}: −2[011]+2[010][011]+2$[011]^2$+2[011][110]−2[111]+2[010][111]+4[011][111]+2[110][111]+2$[111]^2$

{[010], [111]}: 4[011][110]−6[111]+2[010][111]+6[011][111]+6[110][111]+6$[111]^2$

{[011], [011]}:−2[001]+2$[001]^2$−2[011]+4[001][011]+2$[011]^2$−2[101]+4[001][101]+4[011][101]+2$[101]^2$−2[111]+4[001][111]+4[011][111]+4[101][111]+2$[111]^2$

{[011], [100]}: 2[011][101]−2[111]+2[011][111]+2[101][111]+2$[111]^2$

{[011], [101]}:−2[101]+2[001][101]+2[011][101]+2$[101]^2$−2[111]+2[001][111]+2[011][111]+4[101][111]+2$[111]^2$

{[011], [110]}: −2[011]+2[001][011]+2$[011]^2$+2[011][101]−2[111]+2[001][111]+4[011][111]+2[101][111]+2$[111]^2$

{[011], [111]}: 4[011][101]−6[111]+2[001][111]+6[011][111]+6[101][111]+6$[111]^2$

{[100], [100]}: [010][100]+[011][100]+[010][101]+[011][101]−2[110]+[010][110]+[011][110]+[100][110]+[101][110]+2$[110]^2$−2[111]+[010][111]+[011][111]+[100][111]+[101][111]+4[110][111]+2[111]2

{[100], [101]}: [011][100]+[011][101]+[011][110]+[101][110]−2[111]+[011][111]+[100][111]+2[101][111]+2[110][111]+2$[111]^2$

{[100], [110]}: [010][101]+[011][101]+[011][110]+[101][110]−2[111]+[010][111]+2[011][111]+[101][111]+2[110][111]+2[111]2

{[100], [111]}: [011][100]+[010][101]+2[011][101]+2[011][110]+2[101][110]−6[111]+[010][111]+3[011][111]+[100][111]+3[101][111]+6[110][111]+6$[111]^2$

{[101], [101]}: [001][100]+[011][100]−2[101]+[001][101]+[011][101]+[100][101]+2$[101]^2$+[001][110]+[011][110]+[101][110]−2[111]+[001][111]+[011][111]+[100][111]+4[101][111]+[110][111]+2$[111]^2$

{[101], [110]}: [011][101]+[001][110]+[011][110]+[101][110]−2[111]+[001][111]+2[011][111]+2[101][111]+[110][111]+2[111]2

{[101], [111]}: [011][100]+2[011][101]+[001][110]+2[011][110]+2[101][110]−6[111]+[001][111]+3[011][111]+[100][111]+6[101][111]+3[110][111]+6$[111]^2$

{[110], [110]}: [001][010]−2[011]+[001][011]+[010][011]+2$[011]^2$+[010][101]+[011][101]+[001][110]+[011][110]+[101][110]−2[111]+[001][111]+[010][111]+4[011][111]+[101][111]+[110][111]+2[111]2

{[110], [111]}: [010][101]+2[011][101]+[001][110]+2[011][110]+2[101][110]−6[111]+[001][111]+[010][111]+6[011][111]+3[101][111]+3[110][111]+6$[111]^2$

{[111], [111]}: [011][100]+[010][101]+4[011][101]+[001][110]+4[011][110]+4[101][110]−18[111]+[001][111]+[010][111]+9[011][111]+[100][111]+9[101][111]+9[110][111]+18$[111]^2$

While all formulas listed above for entries of the covariance matrix are exact, the formula for {[111], [111]}, which represents Var [nm], is approximately true for large k. The correct expression is composed of two parts, one divided by k−1 and another by k−2. For large enough k, the denominators are roughly equivalent, and the numerators can be combined to what is shown above. For completeness, the correct expression is shown below in connection with Equation 48:

$$\mathrm{Var}[\hat{n}_{111}] = Cov[\hat{n}_{111}, \hat{n}_{111}] = \frac{M_1}{k-1} + \frac{M_2}{k-2} \quad \text{Equation 48}$$

In the example of Equation 48, $M_1$ and $M_2$ can be expressed as follows:

$M_1$=−[001][010][100]+3[011][100]−[001][011][100]−[010][011][100]−2$[011]^2$[100]+3[010][101]−[001][010][101]+8[011][101]−[001][011][101]−[010][011][101]−2$[011]^2$[101]−[010][100][101]−[011][100][101]−2[010]$[101]^2$−2[011]$[101]^2$+3[001][110]−[001][010][110]+8[011][110]−[001][011][110]−[010][011][110]−2$[011]^2$[110]−[001][100][110]−[011][100][110]+8[101][110]−[001][101][110]−[010][101][110]−4[011][101][110]−[100][101][110]−2$[101]^2$[110]−2[001]$[110]^2$−2[011]$[110]^2$−2[101]$[110]^2$−30[111]+3[001][111]+3[010][111]−[001][010][111]+19[011][111]−[001][011][111]−[010][011][111]−2[011]2[111]+3[100][111]−[001][100]2[111]−[010][100][1101][111][10]+19[101][111]−[001][101][111]−4[010][101][111]−9[011][101][111]−[100][101][111]−2[101]2[111]+19[110][111]−4[001][110][111]−[010][110][111]−9[011][110][111]−[100][110][111]−9[101][110][111]−2[110]2[111]+36$[111]^2$−2[001]$[111]^2$−2[010][111]2−8[011]$[111]^2$−2[100]$[111]^2$−8[101]$[111]^2$−8[110]$[111]^2$−6[111]3

$M_2$=+[001][010][100]−2[011][100]+[001][011][100]+[010][011][100]+2$[011]^2$[100]−2[010][101]+[001][010][101]−4[011][101]+[001][011][101]+[010][011][101]+2$[011]^2$[101]+[010][100][101]+[011][100][101]+2[010]$[101]^2$+2[011]$[101]^2$+2[011]$[101]^2$−2[001][110]+[001][010][110]−4[011][110]+[001][011][110]+[010][011][110]+2$[011]^2$[110]+[001][100][110]+[011][100][110]−4[101][110]+[001][101][110]+[010][101][110]+4[011][101][110]+[100][101][110]+2$[101]^2$[110]+2[001]$[110]^2$+2[011]$[110]^2$+2[101]$[110]^2$+12[111]−2[001][111]−2[010][111]+[001][010][111]−10[011][111]+[001][011][111]+[010][011][111]+2[011]2[111]+2[100][111]+[001][100][111]+[010][100][111]+4[011][100][111]−10[101][111]+[001][101][111]+4[010][101][111]+9[011][101][111]+[100][101][111]+2[101]2[111]−10[110][111]+4[001][110][111]+[010][110][111]+9[011][110][111]+[100][110][111]+9[101][110][111]+2$[110]^2$[111]−18$[111]^2$+2[001]$[111]^2$+2[010]$[111]^2$+8[011]$[111]^2$+2[100]$[111]^2$+8[101]$[111]^2$+8[110]$[111]^2$+6[111]3.

For a large vector size k, the two numerators can be combined, producing $M_0=M_1+M_2$. As such, $M_0$ can be determined as shown below, which is identical to the expression given in the entries for the covariance matrix corresponding to {[111], [111]}:

$$M_0=[011][100]+[010][101]+4[011][101]+[001][110]+4[011][110]+4[101][110]-18[111]+[001][111]+[010][111]+9[011][111]+[100][111]+9[101][111]+9[110][111]+18[111]2.$$

As previously described, the full cardinality across all three datasets can be estimated, along with the variance for that estimate. For example, given the elements $\{A_1, A_2, A_3, A_{12}, A_{13}, A_{23}, A_{123}\}$, the total cardinality can be computed via the inclusion-exclusion principle represented as $A=A_1+A_2+A_3-A_{12}-A_{13}-A_{23}+A_{123}$. In some examples, the estimate of A can be computed depending on what is known or estimated. If only $A_{123}$ is unknown and needs to be estimated, we have $\hat{A}=A_1+A_2+A_3-A_{12}-A_{13}-A_{23}+\hat{A}_{123}$. Likewise, if nothing is known, then everything needs to be estimated: $\hat{A}=\hat{A}_1+\hat{A}_2+\hat{A}_3-\hat{A}_1-\hat{A}_{13}-\hat{A}_3+\hat{A}_{123}$. The variance of $\hat{A}$ is not the simple sum of variances of each component as they are correlated. However, linear combinations of the estimates can be performed to compute the estimate of A along with the proper variance. For example, a seven-dimensional joint distribution with expected value and covariance matrix can be given as $\mu=E[V]=(A_1, A_2, A_3, A_{12}, A_{13}, A_{23}, A_{123})$ and $\Sigma=\mathrm{Cov}[V_i, V_j]$. For a given linear combination of the random variables $\mu'=c^T\mu$, the variance of that linear combination can be obtained in accordance with Equation 49:

$$\Sigma'=c^T\Sigma c \qquad \text{Equation 49}$$

For example, depending on what is known apriori, the coefficients of the linear combination can be different. For example, if only $A_{123}$ has to be estimated but all first or second order cardinalities are known exactly, then only the variability within $\hat{A}$ is contained within $\hat{A}_{123}$, and c=(0,0,0, 0,0,0,1). However, if no information is known apriori, and even first order cardinalities need to be estimated, then every component within the expression of A includes variability, such that c=(1, 1, 1, −1, −1, −1, 1). Following the same notation previously described the symbol A*is represented as [*] and numbers not in brackets are coefficients. The overall expression is divided by (n−1) to obtain the variance. For example, for c=(0,0,0,0,0,0,1) with known single and double interactions and an unknown triple interaction, the variance of this linear combination corresponds to $\mathrm{Var}[\hat{A}]$: $-18[123]+2[12][123]+3[123]^2+2[12][13]+2[123][13]+[13][2]+[1][23]+2[12][23]+2[123][23]+2[13][23]+[12][3]$, for c=(0,0,0, −1, −1, −1,1) with known single cardinalities and unknown double and triple interaction, the variance of this linear combination corresponds to Var[A]: $-2[12]+[12]^2+6[123]-2[12][123]+3[123]^2-2[13]-2[123][13]+[13]^2+[1][2]-[13][2]-2[23]-1[23]-2[123][23]+[23]^2+[1][3]-[12][3]+[2][3]$, and for c=(1,1,1, −1, −1, −1,1) with an unknown single, double, or triple interaction, the variance of this linear combination corresponds to $\mathrm{Var}[\hat{A}]$: $-2[1]+2[1]^2+2[12]-4[1][12]+5[12]^2-18[123]+4[1][123]-2[12][123]+3[123]^2+2[13]-4[1][13]+4[12][13]-2[123][13]+5[13]^2-2[2]+[1][2]-4[12][2]+4[123][2]-[13][2]+2[2]^2+2[23]-1[23]+4[12][23]-2[123][23]+4[13][23]-4[2][23]+5[23]2-2[3]+[1][3]-[12][3]+4[123][3]-4[13][3]+[2][3]-4[23][3]+2[3]^2$.

Figure 2:
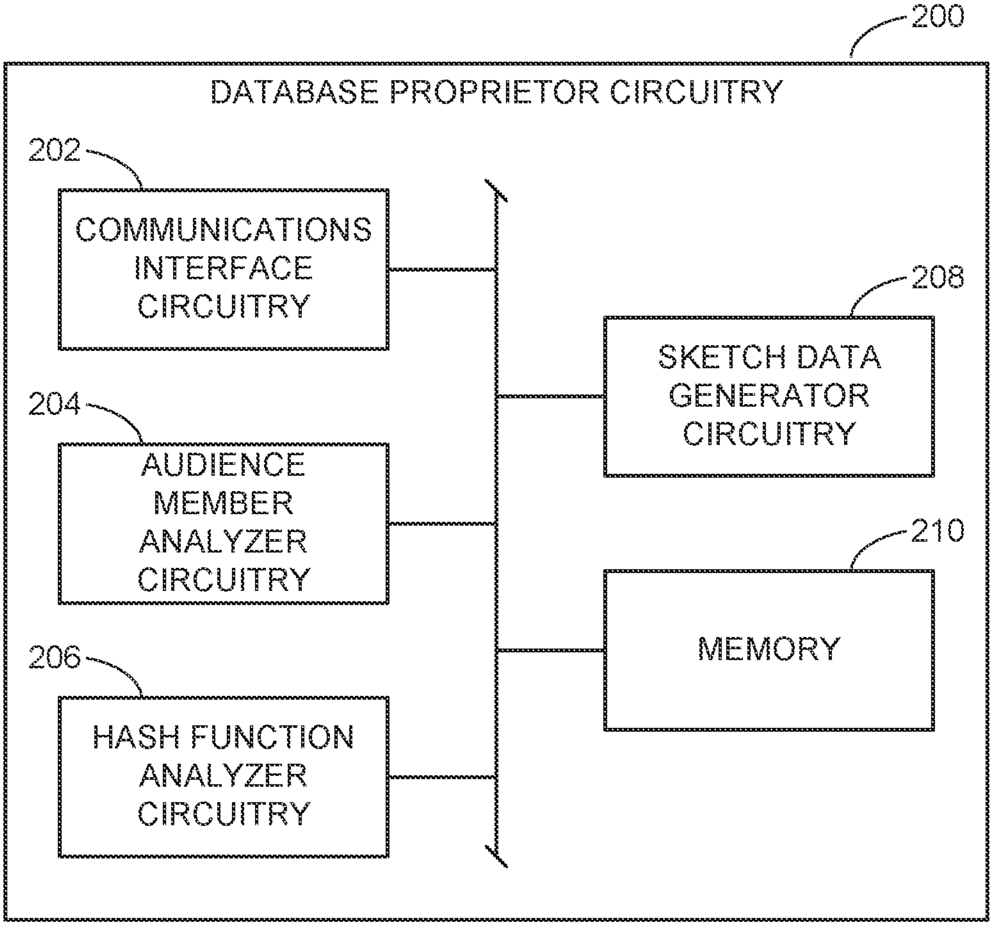
FIG. 2 is an example database proprietor apparatus that may be implemented by either one of the example database proprietors of FIG. 1 to generate and provide sketch data to the example audience measurement entity of FIG. 1 for use in estimating audience sizes of media in accordance with teachings disclosed herein.

FIG. 2 is an example database proprietor circuitry 200 that may be implemented by the example database proprietors 106*a-c* of FIG. 1 to generate and provide the sketch data 132*a-c* to the example AME 102 of FIG. 1. More particularly, in some examples, the database proprietor circuitry 200 may correspond to and/or be implemented by the database proprietor servers 118*a-c* and/or the corresponding database proprietor audience metrics databases 124*a-c* of FIG. 1. As shown in FIG. 2, the example database proprietor circuitry 200 includes example communications interface circuitry 202, example audience member analyzer circuitry 204, example hash function analyzer circuitry 206, example sketch data generator circuitry 208, and example memory 210.

The example communications interface circuitry 202 of FIG. 2 enables communications with client devices 108 (FIG. 1) to obtain the impression requests 122*a-c* (FIG. 1) for audience measurement purposes. Additionally or alternatively, the example communications interface circuitry 202 enables communications with the AME 102. In some examples, the communications interface circuitry 202 receives information from the AME 102 requesting particular sketch data 132*a-c* representative of audience members exposed to a particular media item 114 (FIG. 1). In some examples, the AME 102 may provide parameters defining how the sketch data 132*a-c* is to be generated. For example, the AME 102 may define the length of the vector of counts for the sketch data 132*a-c*. Further, the AME 102 may define the particular hash function and any subsequent procedures to transform the outputs of the hash function into integer values defining the particular elements within the vector of counts to be incremented. In some examples, these sketch data generation parameters may be stored in the example memory 210 for subsequent retrieval and use. Obtaining these parameters from the AME 102 ensures that each database proprietor 106*a-c* generates sketch data 132*a-c* using the same hash functions. In some examples, the communications interface circuitry 202 enables communications with other database proprietors 106*a-c* so that the sketch data generation parameters may be agreed upon between the different database proprietors 106*a-c* (whether or not the AME 102 is involved in the communications). Further, the example communications interface circuitry 202 enables the database proprietor circuitry 200 to transmit the generated sketch data 132*a-c* to the AME 102 for subsequent processing (e.g., to estimate unique audience sizes based on the sketch data 132*a-c* collected from multiple different database proprietors 106*a-c*).

The example audience member analyzer circuitry 204 analyzes data in the example database proprietor audience metrics databases 124*a-c* to identify particular subscribers of the database proprietor 106*a-c* that constitute audience members who accessed or were otherwise exposed to particular media item(s) of interest to the AME 102 for estimating audience sizes. The audience members identified by the audience member analyzer circuitry 204 will correspond to subscribers for which the corresponding database proprietor 106*a-c* has PII data. The PII data for such subscribers/audience members is used as inputs for the hashing function that serves as the basis to generate the values in the vector of counts for the sketch data 132*a-c*. The subscribers/audience members identified by the audience member analyzer circuitry 204 define the pool of individuals represented by the sketch data 132*a-c* to be generated as described above and further outlined below. In some examples, the database proprietor audience metrics database 124*a-c* accessed by the audience member analyzer circuitry 204 corresponds to and/or is included in the example memory 210. In other examples, the database proprietor audience metrics database 124*a-c* may be implemented externally to the example database proprietor circuitry 200. In such examples, the audience member analyzer circuitry 204 may access the database proprietor audience metrics database 124$a$-$c$ through the communications interface 202.

The example hash function analyzer circuitry 206 implements the hash function defined for the sketch data generation across the PII data associated with each of the subscribers identified by the example audience member analyzer 204. In some examples, when more than one hash function is to be used, the hash function analyzer circuitry 206 determines which hash function to use and/or the number of hash functions to use. That is, in some examples, rather than receiving the sketch data generation parameters from the AME 102, the parameters may be determined locally by the hash function analyzer circuitry 206.

Once the hash function analyzer circuitry 206 generates an output of the relevant hash function for a particular subscriber to be included in the sketch data, the example sketch data generator circuitry 208 transforms the output to an integer value. The example sketch data generator circuitry 208 uses the integer value to identify the particular element within the vector of counts to which the particular subscriber is to be allocated. Accordingly, the example sketch data generator circuitry 208 increments the particular element of the vector of counts corresponding to the integer value derived from the output of the hash function.

In some examples, the hash function analyzer circuitry 206 and the sketch data generator circuitry 208 repeat this process for each subscriber to be represented in the sketch data 132$a$-$c$. Additionally or alternatively, in some examples, the sketch data generator circuitry 208 counts the total number of audience members identified by the audience member analyzer circuitry 204 that are represented in the sketch data 132$a$-$c$. This number is referred to herein as the cardinality of the sketch data 132$a$-$c$. In some examples, the individual vector of counts can be mean-centered prior to cardinality estimation (e.g., by a third-party). In some examples, the audience member analyzer circuitry 204 may provide the cardinality of the sketch data 132$a$-$c$ to the sketch data generator circuitry 208. In some examples, the vector of counts for the sketch data 123$a$-$c$ and the cardinality for the sketch data 132$a$-$c$ generated by the sketch data generator are provided to the AME 102 by the communications interface 202. For example, the cardinality estimation can be performed in accordance with Equations 39-45 to obtain an estimate for all intersection cardinalities. In some examples, the sketch data generator circuitry 208 may not separately count and/or provide the cardinality of the sketch data.

While an example manner of implementing the database proprietor circuitry 200 is illustrated in FIG. 2, one or more of the elements, processes and/or devices illustrated in FIG. 2 may be combined, divided, re-arranged, omitted, eliminated and/or implemented in any other way. Further, the example communications interface 202, the example audience member analyzer 204, the example hash function analyzer circuitry 206, the example sketch data generator circuitry 208, the example memory 210, and/or, more generally, the example database proprietor circuitry 200 of FIG. 2 may be implemented by hardware, software, firmware and/or any combination of hardware, software and/or firmware. Thus, for example, any of the example communications interface 202, the example audience member analyzer 204, the example hash function analyzer circuitry 206, the example sketch data generator circuitry 208, the example memory 210, and/or, more generally, the example database proprietor circuitry 200 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example database proprietor circuitry 200 may include one or more elements, processes, and/or devices in addition to, or instead of, those illustrated in FIG. 2, and/or may include more than one of any or all of the illustrated elements, processes and devices.

Figure 3:
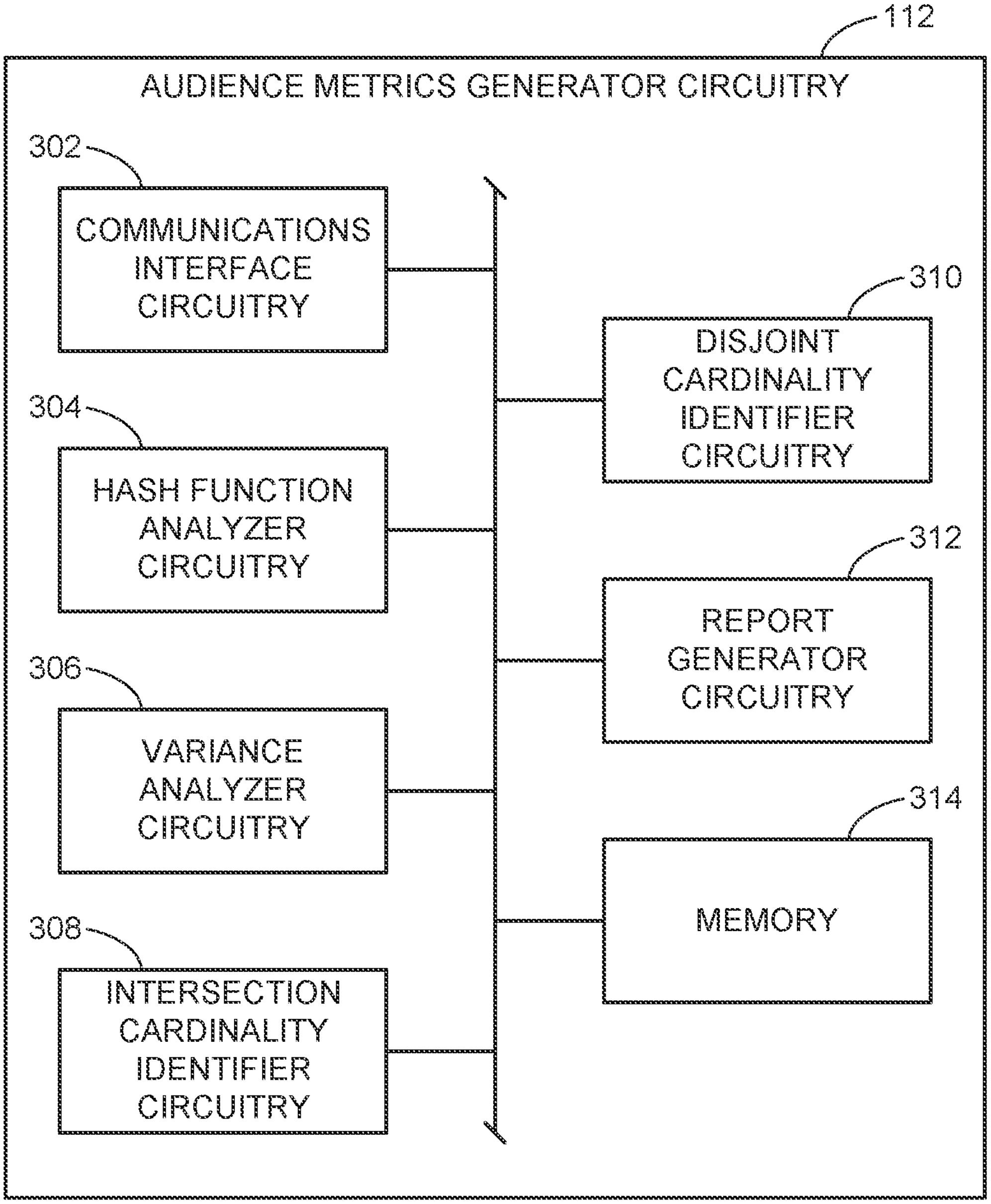
FIG. 3 is an example implementation of the example audience metrics generator of FIG. 1 to estimate audience sizes of media in accordance with teachings disclosed herein.

FIG. 3 is an example implementation of the example audience metrics generator circuitry 112 of FIG. 1 to estimate audience sizes of media in accordance with teachings disclosed herein. As shown in FIG. 3, the example audience metrics generator circuitry 112 includes example communications interface circuitry 302, example hash function analyzer circuitry 304, example variance analyzer circuitry 306, example intersection cardinality identifier circuitry 308, example disjoint cardinality identifier circuitry 310, example report generator circuitry 312, and example memory 314.

The example communications interface circuitry 302 of FIG. 3 enables the audience metrics generator circuitry 112 to communicate with the database proprietors 106$a$-$c$ and/or the client devices 108. That is, in some examples, the communications interface circuitry 302 receives the impression requests 122$a$-$c$ from the client devices. Further, in some examples, the communications interface circuitry 302 receives the sketch data 132$a$-$c$ from the database proprietors. Further, in some examples, the communications interface circuitry 302 transmits or provides sketch data generation parameters to the database proprietors 106$a$-$c$ to enable the database proprietors 106$a$-$c$ to generate the sketch data 132$a$-$c$ so that the data can be combined and analyzed in accordance with teachings disclosed herein. In some examples, the sketch data generation parameters define the length of the vector of counts, the hash function used to allocate subscribers to the vector of counts, and/or the transformation procedures to convert outputs of the hash function to integer values that identify the particular elements in the vector for incrementation (e.g., methodology of converting the hashed value to an entry bin). In some examples, these parameters are determined by the hash function analyzer circuitry 304. In other examples, one or more of the database proprietors 106$a$-$c$ may determine the sketch data generation parameters (e.g., via the hash function analyzer circuitry 206 of FIG. 2).

The example variance analyzer circuitry 306 of FIG. 3 determines the variance of each vector for the sketch data 132$a$-$c$ received from each of the database proprietors 106$a$-$c$. For example, once cardinality estimation is completed (e.g., based on Equations 39-45), the variance analyzer circuitry 306 can be used to estimate the true variance (e.g., using true but unknown values) and the estimated variance (e.g., based on the estimates of the single-intersection cardinalities). In some examples, the variance analyzer circuitry 306 determines variance as described in connection with Equation 49. For example, the variance analyzer circuitry 306 determines variance based on the information that is known (e.g., first order cardinalities, etc.). For example, the variance analyzer circuitry 306 determines the variance of a given linear combination based on whether single, double, and/or triple interactions are known.

The example intersection cardinality identifier circuitry 308 of FIG. 3 identifies a covariance matrix between dimensions of the joint distribution of intersection cardinalities (e.g., based on two variables being compared for their covariance). For example, the intersection cardinality identifier circuitry 308 can determine the covariance matrix entries based on Equation 37. However, in place of using intersection cardinalities, the disjoint cardinality identifier circuitry 310 can be used to estimate disjoint cardinalities instead of the intersection cardinalities. While the intersection and disjoint cardinalities are considered one-to-one and are equivalent (e.g., computations can be performed using either set), some relationships among the datasets can be better determined using one set of cardinalities over the other.

The example disjoint cardinality identifier circuitry 310 of FIG. 3 determines a covariance matrix associated with disjoint cardinalities. For example, in some cases the disjoint cardinalities $\{n_{001}, n_{010}, n_{011}, n_{100}, n_{101}, n_{110}, n_{111}\}$ may be more appropriate for use during data assessment as compared to cardinality quantities $\{A_1, A_2, A_3, A_{12}, A_{13}, A_{23}, A_{123}\}$. The disjoint cardinality identifier circuitry 310 determines covariance matrix entries associated with the disjoint cardinalities using Equation 47. For example, one benefit of using a mutually exclusive set is that there is no need to use the principle of inclusion-exclusions (e.g., objects are not double-counted).

The example report generator circuitry 312 of FIG. 3 determines a final estimate for the unique audience based on the sketch data 132*a-c* as provided by the database proprietors 106*a-c*. In some examples, the report generator circuitry 312 generates a report and/or otherwise transforms the output unique audience estimate in a form that an interested receiving party (e.g., a client or customer of the AME 102) can understand. In some examples, the report includes the unique audience listed and explains the demographics reached by the particular media item associated with the sketch data 132*a-c* provided by the database proprietors 106*a-c*.

The example memory 314 of FIG. 3 stores information received from the client devices 108 (e.g., the impression requests 122*a-c*) and/or the database proprietors 106*a-c* (e.g., the sketch data 132*a-c*). Further, in some examples, the memory 314 stores data generated by one or more of the example hash function analyzer circuitry 304, the example variance analyzer circuitry 306, the example intersection cardinality identifier circuitry 308, the example disjoint cardinality identifier circuitry 310, and/or the example report generator circuitry 312. In some examples, the memory 314 corresponds to and/or includes the audience metrics database 126 of FIG. 1. In other examples, the audience metrics database 126 is implemented independent of the memory 314. In some such examples, data may be transferred between the example memory 314 and the audience metrics database 126 via the communications interface circuitry 302.

While an example manner of implementing the audience metrics generator circuitry 112 of FIG. 1 is illustrated in FIG. 3, one or more of the elements, processes and/or devices illustrated in FIG. 3 may be combined, divided, re-arranged, omitted, eliminated and/or implemented in any other way. Further, the example communications interface circuitry 302, the example hash function analyzer circuitry 304, the example variance analyzer circuitry 306, the example intersection cardinality identifier circuitry 308, the example disjoint cardinality identifier circuitry 310, the example report generator circuitry 312, the example memory 314, and/or, more generally, the example audience metrics generator circuitry 112 of FIG. 3 may be implemented by hardware, software, firmware and/or any combination of hardware, software and/or firmware. Thus, for example, any of the example communications interface circuitry 302, the example hash function analyzer circuitry 304, the example variance analyzer circuitry 306, the example intersection cardinality identifier circuitry 308, the example disjoint cardinality identifier circuitry 310, the example report generator circuitry 312, the example memory 314 and/or, more generally, the example audience metrics generator circuitry 112 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audience metrics generator circuitry 112 of FIG. 1 may include one or more elements, processes, and/or devices in addition to, or instead of, those illustrated in FIG. 3, and/or may include more than one of any or all of the illustrated elements, processes and devices.

Figure 4:
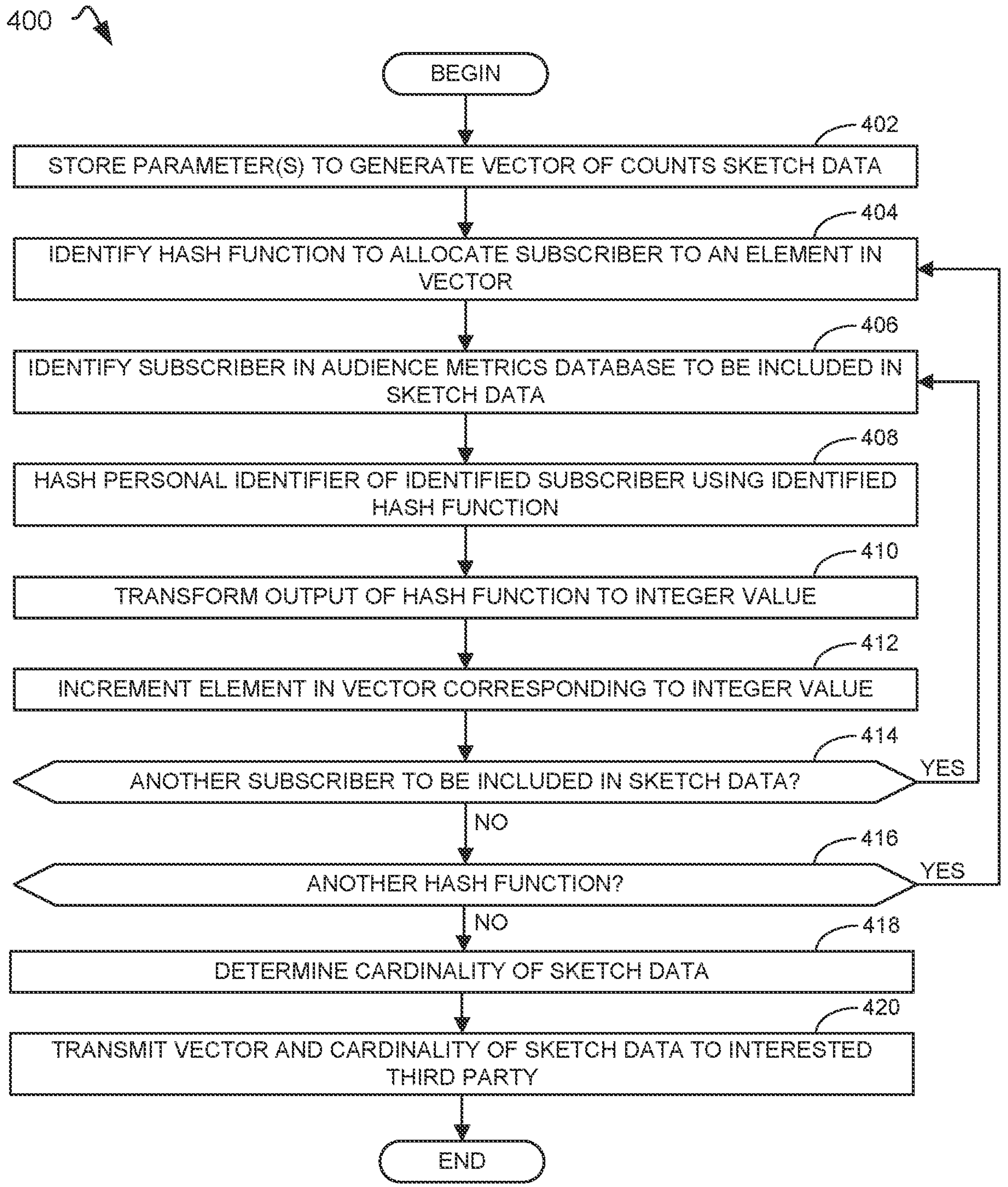
FIG. 4 is a flowchart representative of machine-readable instructions which may be executed to implement the example database proprietor apparatus of FIG. 2 to generate sketch data in accordance with teachings disclosed herein.

A flowchart representative of example machine readable instructions, which may be executed to configure processor circuitry to implement the database proprietor circuitry 200 of FIG. 2 is shown in FIG. 4. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example database proprietor circuitry 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 5:
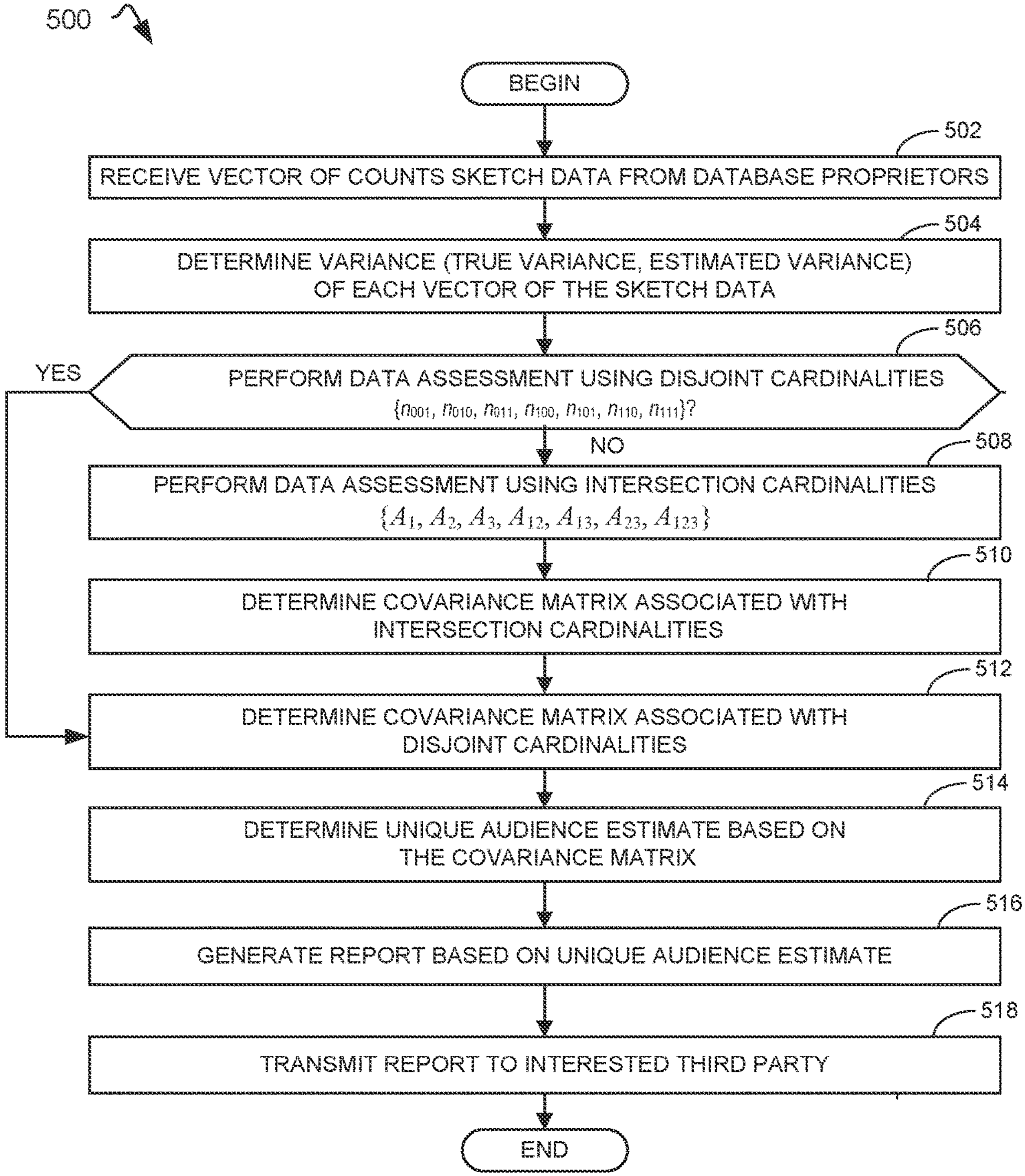
FIG. 5 is a flowchart representative of machine-readable instructions which may be executed to implement the example audience metrics generator of FIGS. 1 and/or 3 to estimate audience sizes in accordance with teachings disclosed herein.

A flowchart representative of example machine readable instructions, which may be executed to configure processor circuitry to implement the audience metric generator circuitry 112 of FIG. 1 is shown in FIG. 5. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example audience metric generator circuitry 112 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to generate sketch data 132*a-c* in accordance with teachings disclosed herein. In some examples, database proprietors 106*a-c* will separately implement the flowchart of FIG. 4. However, for the sake of clarity, the flowchart of FIG. 4 will be described with reference to database proprietor A 106*a*.

The example program of FIG. 4 begins at block 402 at which the example memory 210 (FIG. 2) stores parameter(s) to generate vector of counts sketch data. For example, the vector of counts sketch data can be representative of separate sketch data provided by a given database proprietor (e.g., database proprietor a-c) summarizing the individual subscribers that accessed the media. For example, a vector of values is generated by processing data entries in a database (e.g., database from the given database proprietor a-c) through one or more hash functions. In some examples, the parameters include the particular hash function (or multiple hash functions) used, the procedure to transform the output of the hash function(s) to an integer value to identify a particular data entry within the vector, and/or the number of data entries to be included in the vector (e.g., the vector length). In some examples, the data entries can correspond to subscriber information (e.g., an email address, etc.). A data entry found in multiple datasets (e.g., such as an email address) allows database proprietors to agree on the hashed value of that data entry. For example, sketch data generation parameters may be agreed upon between the different database proprietors 106*a-c*. The generated sketch data (e.g., sketch data 132*a-c*) can be transmitted to the AME 102 for subsequent processing (e.g., to estimate unique audience sizes based on the sketch data 132*a-c* collected from multiple different database proprietors 106*a-c*, etc.). As such, while the database proprietors 106*a-c* collaborate with the AME 102, the database proprietors can protect the personally identifiable information (PII) data (e.g., email addresses, etc.) associated with its subscribers to maintain the privacy of the subscribers. Additionally or alternatively, in some examples, at least some of the sketch data generation parameters may be generated by the hash function analyzer circuitry 206 (FIG. 2) of the database proprietor apparatus 200. When the sketch data generation parameters are agreed upon by the different database proprietors 106*a-c*, this eliminates existing audience metrics measurement inaccuracies that arise when the media may be accessed by multiple different audience members. As such, individuals are not double counted when the same individual is not represented in multiple datasets associated with different sketch data, resulting in correct unique audience size counts. Methods and apparatus disclosed herein likewise introduce an alternative to storing massive amounts of user data or calculating audience overlap for all possible combinations, allowing for improved data processing and overall computer operation efficiency.

At block 404, the example hash function analyzer circuitry 206 identifies a hash function to allocate subscribers to an element in a vector for the sketch data (e.g., the sketch data 132*a*). For example, the PII associated with particular audience members are used as inputs for the hash function(s) to generate outputs corresponding to the values of the vector for the sketch data. Since hashing functions cannot be reversed (e.g., cannot be decoded to recover the original information), the PII data for the particular audience members is kept private, thereby preserving the anonymity of the underlying raw data represented by the sketch data 132*a-c*. This technique, when implemented in accordance with teachings of this disclosure, improves the functioning of a computer by enabling the computer to strengthen the privacy protection of data. For example, a machine or computer implemented in accordance with teachings of this disclosure can generate secured PII data that may be transmitted across network communications without revealing the PII data (e.g., security for data in transit) and has security for the PII data when stored in a local storage or memory (e.g., security for data at rest). Furthermore, if database proprietors 106*a-c* use the same hash function on the same PII (e.g., an email address), the database proprietors 106*a-c* will output the same array of values, preventing the AME 102 from double-counting of individuals when evaluating media exposure based on the datasets provided by the database proprietors 106*a-c*. At block 406, the example audience member analyzer circuitry 204 (FIG. 2) identifies a subscriber in an audience metrics database (e.g., the audience metrics databases 126*a*) to be included in the sketch data 132*a*. In some examples, a particular subscriber is identified for inclusion in the sketch data when the database proprietor 106*a* received at least one impression request 122*a* from the subscriber indicating the subscriber accessed and/or was exposed to particular media item 114 of interest for the sketch data 132*a*. At block 408, the example hash function analyzer circuitry 206 hashes a personal identifier (e.g., PII data) of the identified subscriber using the identified hash function. At block 410, the example hash function analyzer circuitry 206 transforms the output of the hash function to an integer value. In this example, the integer value may correspond to any element of the vector. More particularly, in some examples, the hash function and the subsequent transformation procedure are designed such that the integer value corresponding to any particular element in the vector is equally likely as the integer value corresponding to any other element in the vector. As subsequent entries in the database are hashed and transformed to an integer value, the corresponding element in the vector of counts is incremented such that each element in the final vector represents a count of the total number of entries designated to each element in the vector. As a result, the summation of values across all elements in the vector of counts will correspond to the cardinality of the sketch data (e.g., the total number of unique entries in the database represented by the vector of counts), which allows for the identification of a unique audience count. At block 412, the example sketch data generator circuitry 208 (FIG. 2) increments the element in the vector corresponding to the integer value.

At block 414, the example audience member analyzer circuitry 204 determines whether there is another subscriber to be included in the sketch data. If so, control returns to block 406. Otherwise, control advances to block 416 where the example hash function analyzer circuitry 206 determines whether there is another hash function. For example, multiple different hash functions may be applied to each entry and assigned to a particular element within the vector of counts for improved data security (e.g., improved security for data in transit and improved security for data at rest). If so, control returns to block 404 where a new hash function is identified to repeat the process to allocate all subscribers to the vector of counts a second time. In some examples, only a single hash function may be used such that block 404 and 416 may be omitted. If there are no more hash functions to be applied, control advances to block 418. At block 418, the example sketch data generator circuitry 208 determines the cardinality of the sketch data. At block 420, the example communications interface circuitry 202 transmits the vector and the cardinality of the sketch data 132*a* to an interested third party (e.g., the AME 102). Thereafter, the example instructions of FIG. 4 ends.

FIG. 5 is a flowchart representative of example machine readable instructions and/or example operations 500 that may be executed and/or instantiated by processor circuitry to estimate audience sizes in accordance with teachings disclosed herein. The example program of FIG. 5 begins at block 502 where the communications interface circuitry 302 (FIG. 3) receives vector of counts sketch data (e.g., sketch data 132*a-c*) from the database proprietors (e.g., database proprietors 106*a-c*). In some examples, the sketch data 132*a-c* is generated based on the implementation of the flowchart of FIG. 4 described above. At block 504, the example variance analyzer circuitry 306 (FIG. 3) determines the variance of each of the first, second, and third sketch data 132*a-c*. In some examples, the variance analyzer circuitry 306 determines the variance (e.g., true variance, estimated variance) based on Equation 49, once the cardinality estimation is completed (e.g., based on Equations 39-45). In some examples, the variance analyzer circuitry 306 determines the variance of a given linear combination based on whether single, double, and/or triple interactions are known. As part of data assessment (e.g., determining unique audience count), the variance analyzer circuitry 306 generates a covariance matrix based on intersection cardinalities and/or disjoint cardinalities. For example, at block 506, the disjoint cardinality identifier circuitry 310 (FIG. 3) determines whether data assessment performed on the sketch data will use disjoint cardinalities (e.g., $n_{001}$, $n_{010}$, non, $n_{100}$, $n_{101}$, $n_{110}$, $n_{111}$}. If the data assessment is not to rely on disjoint cardinalities (block 506: No), at block 508 the intersection cardinality identifier circuitry 308 (FIG. 3) performs data assessment on the sketch data using intersection cardinalities (e.g., $A_1$, $A_2$, $A_3$, $A_{12}$, $A_{13}$, $A_{23}$, $A_{123}$}. At block 510, the intersection cardinality identifier circuitry 308 determines a covariance matrix associated with the intersection cardinalities.

After determining the covariance matrix at block 510, or if, at block 506, the disjoint cardinality identifier circuitry 310 determines the data assessment is to use disjoint cardinalities, control advances to block 512 at which the disjoint cardinality identifier circuitry 310 (FIG. 3) determines a covariance matrix associated with the disjoint cardinalities. At block 514, the audience metrics generator 112 determines a unique audience estimate based on the covariance matrix. For example, the report generator circuitry 312 (FIG. 3) can determine the unique audience estimate by performing audience metric estimations (e.g., unique audience size assessment) based on the covariance matrix associated with the intersection cardinalities and/or the disjoint cardinalities. For example, the report generator circuitry 312 (FIG. 3) can determine a unique audience estimate using a given covariance matrix (e.g., for first sketch data, second sketch data, and/or third sketch data). At block 516, the report generator circuitry 312 generates a report based on the unique audience estimate. For example, the report can include unique audience/deduplicate impressions across the multiple database proprietors (e.g., database proprietors a-c), custom date ranges, custom combinations of assets and platforms, etc. For example, the report can include determined audience sizes based on media impressions logged by the database proprietors 106*a-c*. At block 518, the example report generator circuitry 312 transmits the report to an interested third party. Thereafter, the example process of FIG. 5 ends. As such, the audience metrics generator circuitry 112 permits the deduplication of individuals represented across multiple datasets, allowing for accurate estimation of a unique audience for a particular media item. The data assessment performed using disjoint cardinalities and/or intersection cardinalities (e.g., using intersection cardinality identifier circuitry 308, disjoint cardinality identifier circuitry 310, etc.) to determine a covariance matrix improves the efficiency of computer processing by allowing for organized assessment and evaluation of the vector of counts sketch data received from the database proprietors. As previously described, the functioning of a computer is improved by strengthening the privacy protection of data. For example, secured PII data may be transmitted across network communications without revealing the PII data (e.g., security for data in transit) while maintaining security for the PII data when the data is stored in a local storage or memory (e.g., security for data at rest).

Figure 6:
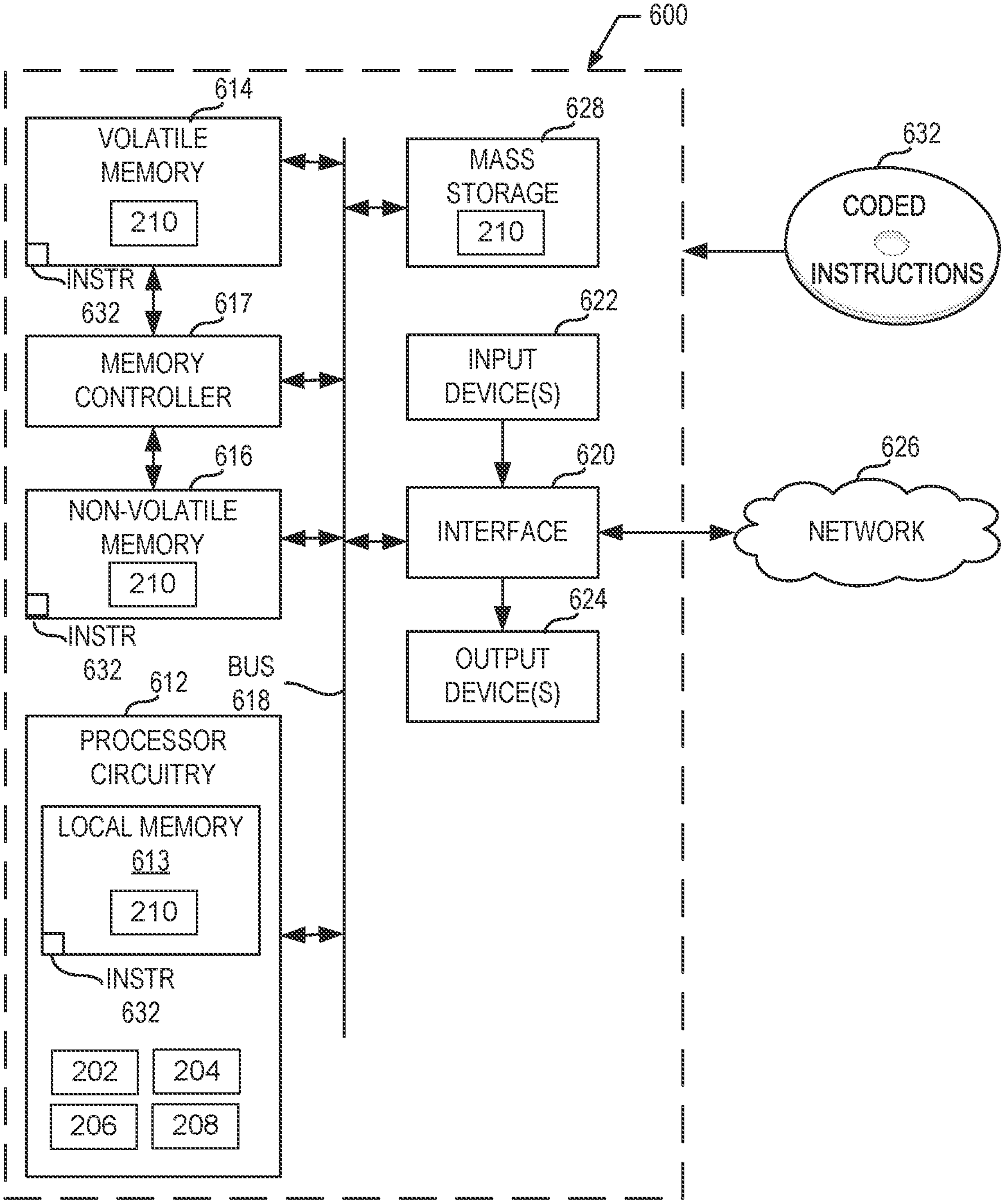
FIG. 6 is a block diagram of an example processing platform structured to execute the instructions of FIG. 4 to implement the example database proprietor apparatus of FIG. 2 to generate sketch data in accordance with teachings disclosed herein.

FIG. 6 is a block diagram of an example processor platform 600 structured to execute and/or instantiate the machine readable instructions and/or the operations of FIG. 4 to implement the database proprietor circuitry 200 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example communications interface circuitry 202, the example audience member analyzer circuitry 204, the example hash function analyzer circuitry 206, and/or the example sketch data generator circuitry 208.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIG. 4, may be stored in the mass storage device 628, in the volatile memory 614, in the non-volatile memory 616, and/or on a removable non-transitory computer readable storage medium such as a CD or DVD.

Figure 7:
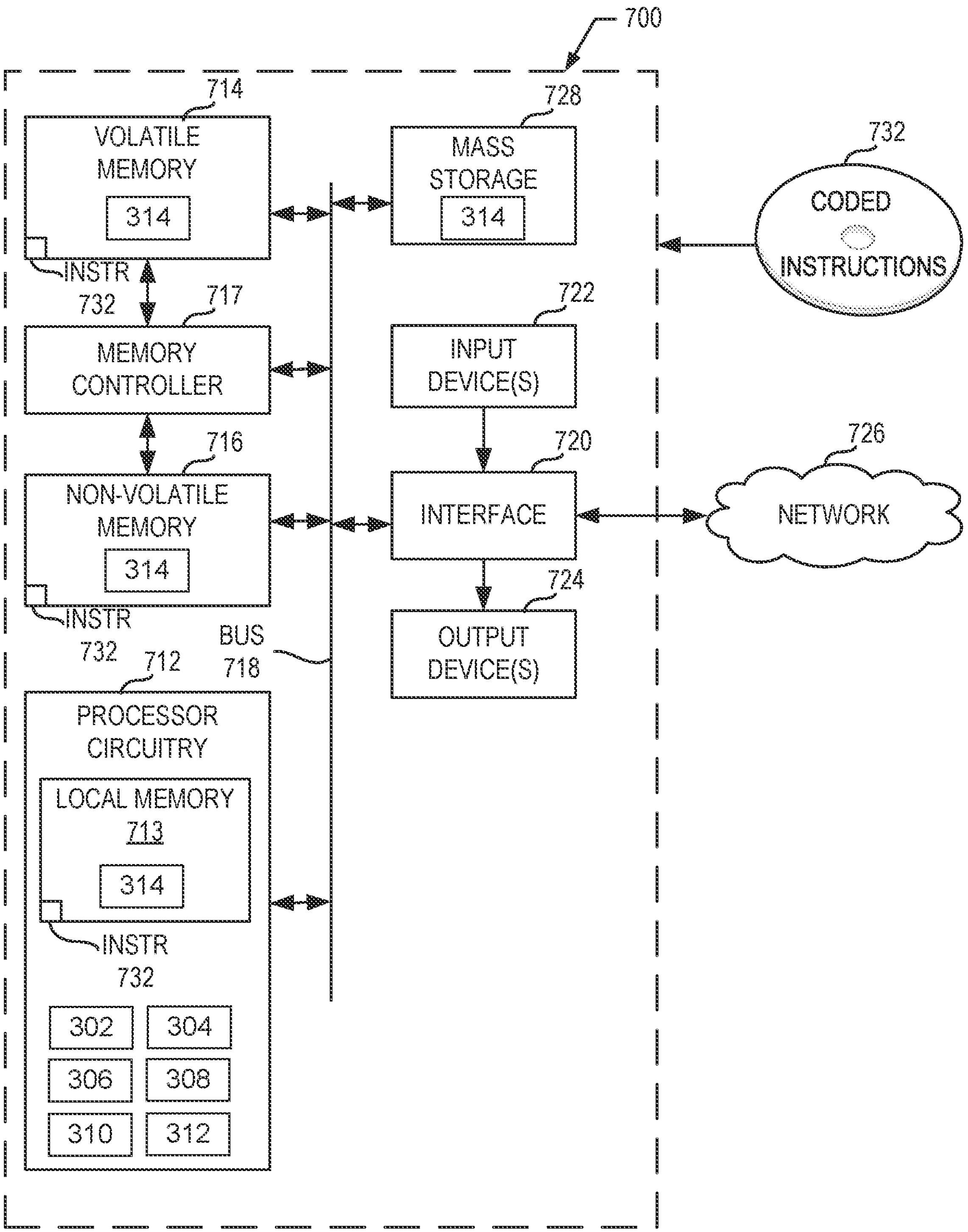
FIG. 7 is a block diagram of an example processing platform structured to execute the instructions of FIG. 5 to implement the example audience metrics generator of FIGS. 1 and/or 3 to estimate audience sizes in accordance with teachings disclosed herein.

FIG. 7 is a block diagram of an example processor platform 700 structured to execute and/or instantiate the machine readable instructions and/or the operations of FIG. 5 to implement the audience metrics generator circuitry of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example communications interface circuitry 302, the example hash function analyzer circuitry 304, the example variance analyzer circuitry 306, the example intersection cardinality identifier circuitry 308, the example disjoint cardinality identifier circuitry 310, and/or the report generator circuitry 312.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 5, may be stored in the mass storage device 728, in the volatile memory 714, in the non-volatile memory 716, and/or on a removable non-transitory computer readable storage medium such as a CD or DVD.

Figure 8:
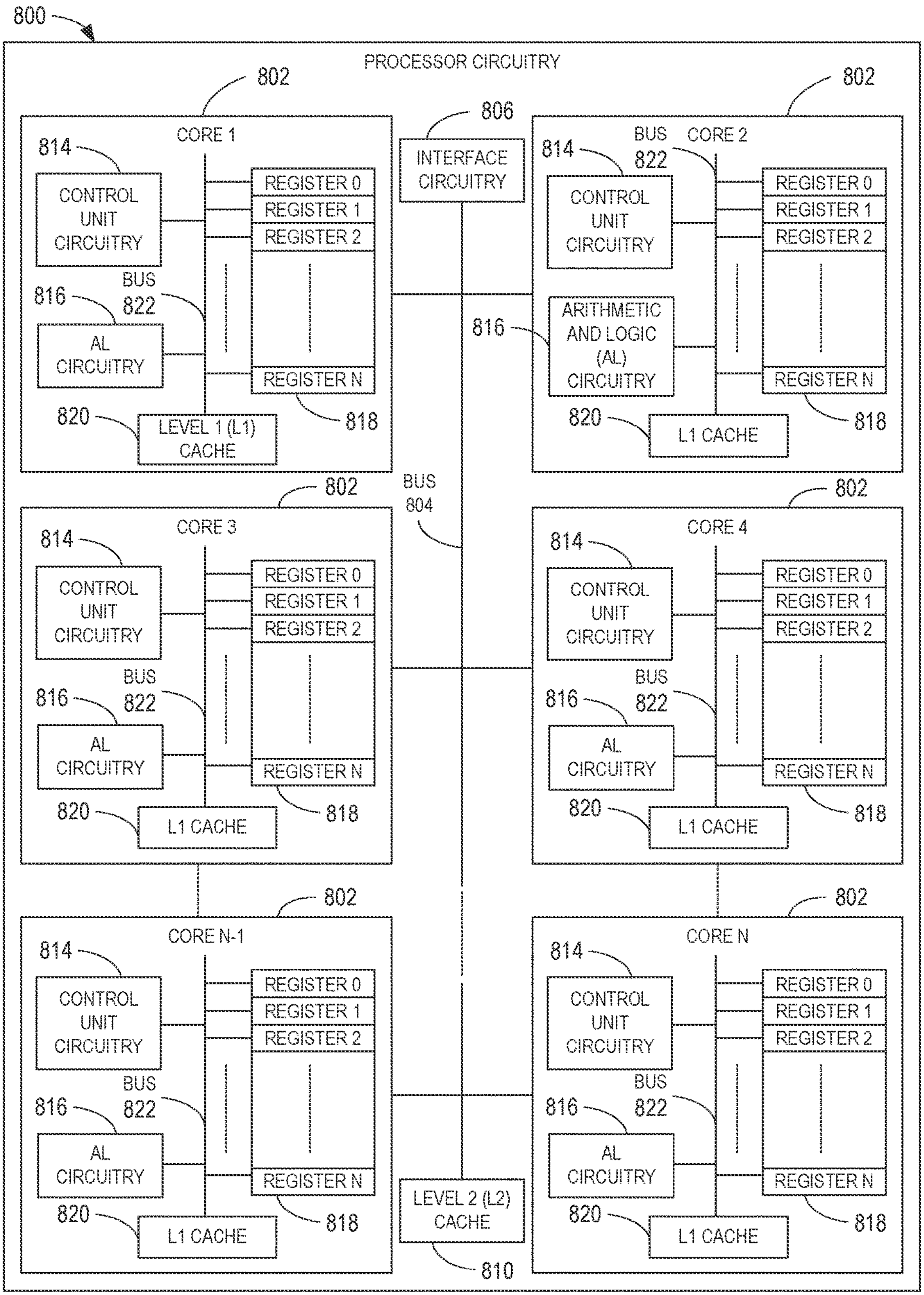
FIG. 8 is a block diagram of an example implementation of the processor circuitry of FIGS. 6 and/or 7.

FIG. 8 is a block diagram of an example implementation of the processor circuitry 612, 712 of FIGS. 6-7. In this example, the processor circuitry 612, 712 of FIGS. 6-7 is implemented by a microprocessor 800. For example, the microprocessor 800 may be a general purpose microprocessor (e.g., general purpose microprocessor circuitry). The microprocessor 800 executes some or all of the machine readable instructions of the flowchart of FIGS. 4-5 to effectively instantiate the circuitry of FIGS. 2-3 as logic circuits to perform the operations corresponding to those machine readable instructions. In some such examples, the circuitry of FIG. 2-3 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIGS. 4-5.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 614, 616 of FIG. 6 and/or main memory 714, 716 of FIG. 7). Typically, higher levels of memory in the hierarchy exhibit lower access time and have smaller storage capacity than lower levels of memory.

Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
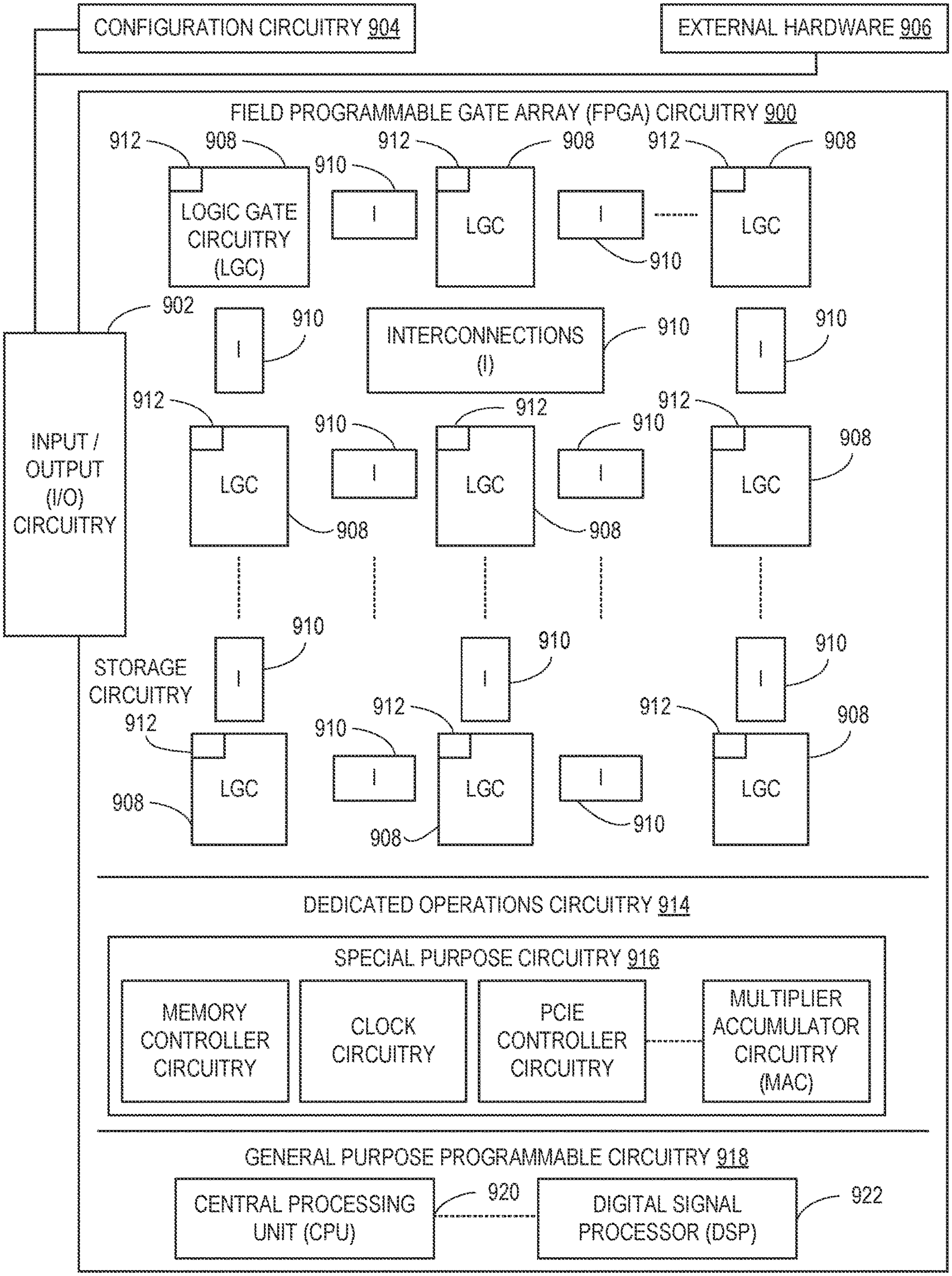
FIG. 9 is a block diagram of another example implementation of the processor circuitry of FIGS. 6 and/or 7.

FIG. 9 is a block diagram of another example implementation of the processor circuitry 612 of FIGS. 6 and/or 712 of FIG. 7. In this example, the processor circuitry 612, 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4-5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4-5. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4-5. As such, the FPGA circuitry 900 may be structured to effectively instantiate some or all of the machine readable instructions of the flowcharts of FIGS. 4-5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4-5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 4-5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 612, 712 of FIGS. 6-7, many other approaches are contemplated. For example, as mentioned above, modern FPGA circuitry may include an on-board CPU, such as one or more of the example CPU 920 of FIG. 9. Therefore, the processor circuitry 612, 712 of FIG. 6-7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4-5 may be executed by one or more of the cores 902 of FIG. 9, a second portion of the machine readable instructions represented by the flowcharts of FIGS. 4-5 may be executed by the FPGA circuitry 900 of FIG. 9, and/or a third portion of the machine readable instructions represented by the flowcharts of FIGS. 4-5 may be executed by an ASIC. It should be understood that some or all of the circuitry of FIGS. 6-7 may, thus, be instantiated at the same or different times. Some or all of the circuitry may be instantiated, for example, in one or more threads executing concurrently and/or in series. Moreover, in some examples, some or all of the circuitry of FIGS. 6-7 may be implemented within one or more virtual machines and/or containers executing on the microprocessor.

In some examples, the processor circuitry 612, 712 of FIGS. 6-7 may be in one or more packages. For example, the microprocessor 800 of FIG. 8 and/or the FPGA circuitry 900 of FIG. 9 may be in one or more packages. In some examples, an XPU may be implemented by the processor circuitry 612, 712 of FIGS. 6-7, which may be in one or more packages. For example, the XPU may include a CPU in one package, a DSP in another package, a GPU in yet another package, and an FPGA in still yet another package.

Figure 10:
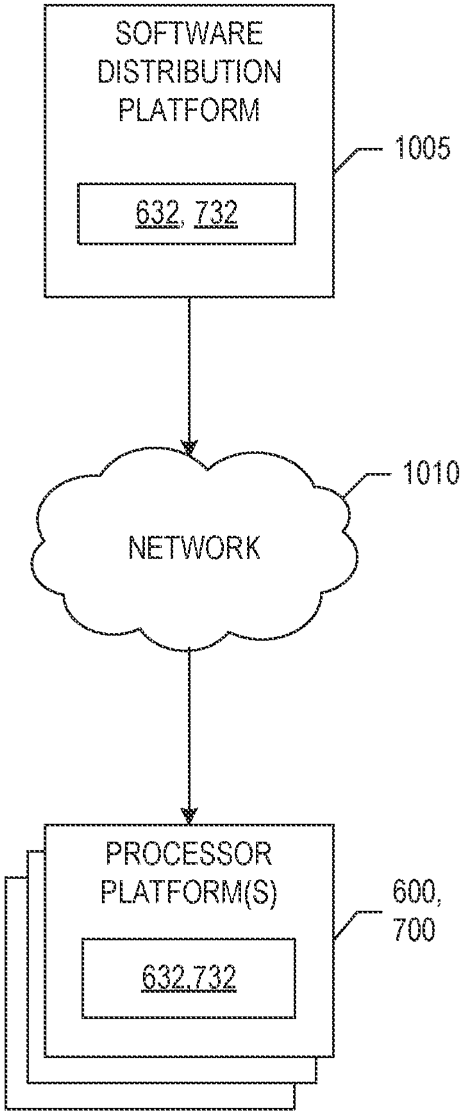
FIG. 10 is a block diagram of an example software distribution platform (e.g., one or more servers) to distribute software (e.g., software corresponding to the example machine readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 632, 732 of FIGS. 6-7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 632, 732 of FIGS. 6-7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 632, 732 which may correspond to the example machine readable instructions 400, 500 of FIGS. 4-5, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632, 732 from the software distribution platform 1005. For example, the software, which may correspond to the example machine readable instructions 400, 500 of FIGS. 4-5, may be downloaded to the example processor platform 600, 700, which is to execute the machine readable instructions 632, 732 to implement the database proprietor circuitry 200 and/or the audience metrics generator circuitry 112. In some examples, one or more servers of the software distribution platform 1005 periodically offer, transmit, and/or force updates to the software (e.g., the example machine readable instructions 632, 732 of FIGS. 6-7) to ensure improvements, patches, updates, etc., are distributed and applied to the software at the end user devices.

From the foregoing, it will be appreciated that example systems, methods, apparatus, and articles of manufacture have been disclosed that permit audience-based deduplication using vector-of-counts (VOC) central moments. For example, methods and apparatus disclosed herein permit the estimation of sketch data provided by three different datasets so that an audience measurement entity may be able to deduplicate individuals represented across the three datasets, thereby enabling the accurate estimate of the unique audience for a particular media item. In particular, the audience metrics generator circuitry 112 of FIGS. 1 and 2 described herein performs the vector of counts data assessment using disjoint cardinalities and/or intersection cardinalities (e.g., using the intersection cardinality identifier circuitry 308, the disjoint cardinality identifier circuitry 310, etc.) to determine a covariance matrix, resulting in the improved efficiency of computer processing by allowing for organized assessment and evaluation of the vector of counts sketch data received from the database proprietors. Furthermore, methods and apparatus disclosed herein permit personally identifiable information (PII) for audience members to remain private, thereby preserving the anonymity of the underlying raw data represented by the sketch data. Methods and apparatus disclosed herein improve the functioning of a computer by enabling the computer to strengthen the privacy protection of data. For example, a machine or computer implemented in accordance with teachings of this disclosure can generate secured PII data that may be transmitted across network communications without revealing the PII data (e.g., security for data in transit) and has security for the PII data when stored in a local storage or memory (e.g., security for data at rest).

Example methods, apparatus, systems, and articles of manufacture to perform audience-based deduplication using vector-of-counts (VOC) central moments are disclosed herein. Further examples and combinations thereof include the following:

Example 1 includes a system to determine an audience size for media based on vector of counts sketch data, the system comprising memory, programmable circuitry, and instructions to cause the programmable circuitry to apply a hash function to first vector of counts sketch data, second vector of counts sketch data, and third vector of counts sketch data to remove personally identifiable information, determine a first covariance matrix associated with intersection cardinalities of at least two of the first, second, or third vector of counts, determine a second covariance matrix associated with disjoint cardinalities of the at least two of the first, second, or third vector of counts, and determine the audience size based on the first covariance matrix or the second covariance matrix.

Example 2 includes the system of example 1, wherein the first vector of counts is associated with a first database proprietor, the second vector of counts is associated with a second database proprietor, and the third vector of counts is associated with a third database proprietor.

Example 3 includes the system of example 2, wherein the first database proprietor, the second database proprietor, and the third database proprietor generate a same vector length associated with the first vector of counts, the second vector of counts, and the third vector of counts.

Example 4 includes the system of example 3, wherein the first vector of counts, the second vector of counts, and the third vector of counts is mean-centered prior to cardinality estimation.

Example 5 includes the system of example 2, wherein the first vector of counts includes a first number of elements, ones of the elements in the first vector of counts corresponding to total numbers of first subscribers of the first database proprietor that accessed the media, the first subscribers allocated to the respective ones of the elements in the first vector of counts based on a hash function applied to information associated with the first subscribers.

Example 6 includes the system of example 5, wherein the information is the personally identifiable information.

Example 7 includes the system of example 5, wherein allocations of the first subscribers to ones of the elements in the first vector of counts are based on an integer value, the integer value derived from an output of the hash function, the hash function applied to the information associated with respective ones of the first subscribers.

Example 8 includes the system of example 1, wherein the programmable circuitry is to determine variance of the first vector of counts, the second vector of counts, or the third vector of counts based on single, double, or triple interactions.

Example 9 includes a method to determine an audience size for media based on vector of counts sketch data, the method comprising applying a hash function to first vector of counts sketch data, a second vector of counts sketch data, and a third vector of counts sketch data to remove personally identifiable information, determining a first covariance matrix associated with intersection cardinalities of at least two of the first, second, or third vector of counts, determining a second covariance matrix associated with disjoint cardinalities the at least two of the first, second, or third vector of counts, and determining the audience size based on the first covariance matrix or the second covariance matrix.

Example 10 includes the method of example 9, wherein the first vector of counts is associated with a first database proprietor, the second vector of counts is associated with a second database proprietor, and the third vector of counts is associated with a third database proprietor.

Example 11 includes the method of example 10, wherein the first database proprietor, the second database proprietor, and the third database proprietor generate a same vector length associated with the first vector of counts, the second vector of counts, and the third vector of counts.

Example 12 includes the method of example 11, wherein the first vector of counts, the second vector of counts, and the third vector of counts is mean-centered prior to cardinality estimation.

Example 13 includes the method of example 10, wherein the first vector of counts includes a first number of elements, ones of the elements in the first vector of counts corresponding to total numbers of first subscribers of the first database proprietor that accessed the media, the first subscribers allocated to the respective ones of the elements in the first vector of counts based on a hash function applied to information associated with the first subscribers.

Example 14 includes the method of example 13, wherein the information is the personally identifiable information.

Example 15 includes the method of example 13, wherein allocations of the first subscribers to ones of the elements in the first vector of counts are based on an integer value, the integer value derived from an output of the hash function, the hash function applied to the information associated with respective ones of the first subscribers.

Example 16 includes the method of example 9, further including determining variance of the first vector of counts, the second vector of counts, or the third vector of counts based on single, double, or triple interactions.

Example 17 includes a non-transitory computer readable medium comprising instructions that, when executed, cause a machine to at least apply a hash function to first vector of counts sketch data, second vector of counts sketch data, and third vector of counts sketch data to remove personally identifiable information, determine a first covariance matrix associated with intersection cardinalities of at least two of the first, second, or third vector of counts, determine a second covariance matrix associated with disjoint cardinalities of the at least two of first, second, or third vector of counts, and determine an audience size for media based on the first covariance matrix or the second covariance matrix.

Example 18 includes the non-transitory computer readable medium of example 17, wherein the first vector of counts is associated with a first database proprietor, the second vector of counts is associated with a second database proprietor, and the third vector of counts is associated with a third database proprietor.

Example 19 includes the non-transitory computer readable medium of example 18, wherein the first database proprietor, the second database proprietor, and the third database proprietor generate a same vector length associated with the first vector of counts, the second vector of counts, and the third vector of counts.

Example 20 includes the non-transitory computer readable medium of example 19, wherein the first vector of counts, the second vector of counts, and the third vector of counts is mean-centered prior to cardinality estimation.

Example 21 includes the non-transitory computer readable medium of example 18, wherein the first vector of counts includes a first number of elements, ones of the elements in the first vector of counts corresponding to total numbers of first subscribers of the first database proprietor that accessed the media, the first subscribers allocated to the respective ones of the elements in the first vector of counts based on a hash function applied to information associated with the first subscribers.

Example 22 includes the non-transitory computer readable medium of example 21, wherein the information is the personally identifiable information.

Example 23 includes the non-transitory computer readable medium of example 21, wherein allocations of the first subscribers to ones of the elements in the first vector of counts are based on an integer value, the integer value derived from an output of the hash function, the hash function applied to the information associated with respective ones of the first subscribers.

Example 24 includes the non-transitory computer readable medium of example 17, wherein the instructions when executed cause the machine to determine variance of the first vector of counts, the second vector of counts, or the third vector of counts based on single, double, or triple interactions.

Example 25 includes a system to determine an audience size for media based on vector of counts sketch data, the system comprising hash function analyzer circuitry to apply a hash function to first vector of counts sketch data, second vector of counts sketch data, and third vector of counts sketch data to remove personally identifiable information, intersection cardinality identifier circuitry to determine a first covariance matrix associated with intersection cardinalities of at least two of the first, second, or third vector of counts, disjoint cardinality identifier circuitry to determine a second covariance matrix associated with disjoint cardinalities of the at least two of the first, second, or third vector of counts, and report generator circuitry to determine the audience size based on the first covariance matrix or the second covariance matrix.

Example 26 includes the system of example 25, wherein the first vector of counts is associated with a first database proprietor, the second vector of counts is associated with a second database proprietor, and the third vector of counts is associated with a third database proprietor.

Example 27 includes the system of example 26, wherein the first database proprietor, the second database proprietor, and the third database proprietor generate a same vector length associated with the first vector of counts, the second vector of counts, and the third vector of counts.

Example 28 includes the system of example 27, wherein the first vector of counts, the second vector of counts, and the third vector of counts is mean-centered prior to cardinality estimation.

Example 29 includes the system of example 26, wherein the first vector of counts includes a first number of elements, ones of the elements in the first vector of counts corresponding to total numbers of first subscribers of the first database proprietor that accessed the media, the first subscribers allocated to the respective ones of the elements in the first vector of counts based on a hash function applied to information associated with the first subscribers.

Example 30 includes the system of example 29, wherein the information is the personally identifiable information.

Example 31 includes the system of example 29, wherein allocations of the first subscribers to ones of the elements in the first vector of counts are based on an integer value, the integer value derived from an output of the hash function, the hash function applied to the information associated with respective ones of the first subscribers.

Example 32 includes the system of example 25, further including variance analyzer circuitry to determine variance of the first vector of counts, the second vector of counts, or the third vector of counts based on single, double, or triple interactions.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An audience measurement system comprising:

a processor; and a non-transitory computer-readable storage medium, having stored thereon program instructions that, when executed by the processor, cause performance of a set of operations comprising:

receive, from respective communication interface circuitry of respective database proprietors, network communications comprising a first vector of counts sketch data from a first database proprietor, a second vector of counts sketch data from a second database proprietor, and a third vector of counts sketch data from a third database proprietor, wherein the first vector includes a first number of elements, ones of the elements in the first vector corresponding to total numbers of first subscribers of the first database proprietor that accessed media, the first subscribers allocated to the respective ones of the elements in the first vector of counts based on hashing of first information associated with the first subscribers to secure first personally identifiable information, wherein the second vector includes a second number of second elements associated with total numbers of second subscribers of the second database proprietor that accessed the media, the second subscribers allocated to respective ones of the second elements in the second vector of counts based on hashing of second information associated with the second subscribers to secure second personally identifiable information, wherein the third vector includes a third number of third elements associated with total numbers of third subscribers of the third database proprietor that accessed the media, the third subscribers allocated to respective ones of the third elements in the third vector of counts based on hashing of third information associated with the third subscribers to secure third personally identifiable information, wherein allocations of the first subscribers to ones of the elements in the first vector of counts are based on an integer value, the integer value derived from an output of the hashing of the first information associated with respective ones of the first subscribers;

wherein each of the first vector of counts, the second vector of counts, and the third vector of counts all share the same vector length (k) such that the allocations of the first subscribers to the ones of the elements in the first vector of counts are in accordance with a 1/k probability of being selected;

determine, using at least two of the first vector, the second vector, or the third vector, a first covariance matrix associated with intersection cardinalities of the at least two of the first vector, the second vector, or the third vector;

determine, using the at least two of the first vector, the second vector, or the third vector, a second covariance matrix associated with disjoint cardinalities of the at least two of the first vector, the second vector, or the third vector; and determine an audience size for the media based on the first covariance matrix or the second covariance matrix.

2. The audience measurement system of claim 1, wherein the first database proprietor, the second database proprietor, and the third database proprietor generate the same vector length (k) associated with the first vector, the second vector, and the third vector.

3. The audience measurement system of claim 2, wherein the first vector, the second vector, and the third vector are mean-centered prior to cardinality estimation.

4. The audience measurement system of claim 1, wherein the first information is the first personally identifiable information.

5. The audience measurement system of claim 1, wherein the set of operations further comprising determine a variance of the first vector of counts, the second vector of counts, or the third vector of counts based on single, double, or triple interactions.

6. A method comprising:

receiving, from respective communication interface circuitry of respective database proprietors, network communications comprising a first vector of counts sketch data from a first database proprietor, a second vector of counts sketch data from a second database proprietor, and a third vector of counts sketch data from a third database proprietor, wherein the first vector includes a first number of elements, ones of the elements in the first vector corresponding to total numbers of first subscribers of the first database proprietor that accessed media, the first subscribers allocated to the respective ones of the elements in the first vector of counts based on hashing of first information associated with the first subscribers to secure first personally identifiable information, wherein the second vector includes a second number of second elements associated with total numbers of second subscribers of the second database proprietor that accessed the media, the second subscribers allocated to respective ones of the second elements in the second vector of counts based on hashing of second information associated with the second subscribers to secure second personally identifiable information, wherein the third vector includes a third number of third elements associated with total numbers of third subscribers of the third database proprietor that accessed the media, the third subscribers allocated to respective ones of the third elements in the third vector of counts based on hashing of third information associated with the third subscribers to secure third personally identifiable information, wherein allocations of the first subscribers to ones of the elements in the first vector of counts are based on an integer value, the integer value derived from an output of the hashing of the first information associated with respective ones of the first subscribers, wherein each of the first vector of counts, the second vector of counts, and the third vector of counts all share the same vector length (k) such that the allocations of the first subscribers to the ones of the elements in the first vector of counts are in accordance with a 1/k probability of being selected;

determining, using at least two of the first vector, the second vector, or the third vector, a first covariance matrix associated with intersection cardinalities of the at least two of the first vector, the second vector, or the third vector;

determining, using the at least two of the first vector, the second vector, or the third vector, a second covariance matrix associated with disjoint cardinalities of the at least two of the first vector, the second vector, or the third vector; and determining an audience size for the media based on the first covariance matrix or the second covariance matrix.

7. The method of claim 6, wherein the first database proprietor, the second database proprietor, and the third database proprietor generate the same vector length (k) associated with the first vector of counts, the second vector of counts, and the third vector.

8. The method of claim 7, wherein the first vector, the second vector, and the third vector are mean-centered prior to cardinality estimation.

9. The method of claim 2, wherein the first information is the personally identifiable information.

10. The method of claim 6, further comprising determining variance of the first vector of counts, the second vector of counts, or the third vector of counts based on single, double, or triple interactions.

11. A non-transitory computer readable medium comprising instructions that, when executed, cause a machine to:

receive, from respective communication interface circuitry of respective database proprietors, network communications comprising, a first vector of counts sketch data from a first database proprietor, a second vector of counts sketch data from a second database proprietor, and a third vector of counts sketch data from a third database proprietor, wherein the first vector includes a first number of elements, ones of the elements in the first vector corresponding to total numbers of first subscribers of the first database proprietor that accessed media, the first subscribers allocated to the respective ones of the elements in the first vector of counts based on hashing of first information associated with the first subscribers to secure first personally identifiable information, wherein the second vector includes a second number of second elements associated with total numbers of second subscribers of the second database proprietor that accessed the media, the second subscribers allocated to respective ones of the second elements in the second vector of counts based on hashing of second information associated with the second subscribers to secure second personally identifiable information, wherein the third vector includes a third number of third elements associated with total numbers of third subscribers of the third database proprietor that accessed the media, the third subscribers allocated to respective ones of the third elements in the third vector of counts based on hashing of third information associated with the third subscribers to secure third personally identifiable information, wherein allocations of the first subscribers to ones of the elements in the first vector of counts are based on an integer value, the integer value derived from an output of the hashing of the first information associated with respective ones of the first subscribers;

wherein each of the first vector of counts, the second vector of counts, and the third vector of counts all share the same vector length (k) such that the allocations of the first subscribers to the ones of the element in the first vector of counts are in accordance with a 1/k probability of being selected;

determine, using at least two of the first vector, the second vector, or the third vector, a first covariance matrix associated with intersection cardinalities of the at least two of the first vector, the second vector, or the third vector;

determine, using the at least two of the first vector, the second vector, or the third vector, a second covariance matrix associated with disjoint cardinalities of the at least two of the first vector, the second vector, or the third vector; and determine an audience size for the media based on the first covariance matrix or the second covariance matrix.

12. The non-transitory computer readable medium of claim 11, wherein the first database proprietor, the second database proprietor, and the third database proprietor generate the same vector length (k) associated with the first vector, the second vector, and the third vector.

13. The non-transitory computer readable medium of claim 12, wherein the first vector, the second vector, and the third vector is mean-centered prior to cardinality estimation.

* * * * *